US008887855B2

(12) United States Patent
Kamada et al.

(10) Patent No.: US 8,887,855 B2
(45) Date of Patent: Nov. 18, 2014

(54) HYDRAULIC FOUR-WHEEL-DRIVE WORK VEHICLE

(75) Inventors: Minoru Kamada, Amagasaki (JP); Nobuhiko Ichinose, Osaka (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 13/807,863

(22) PCT Filed: Jul. 1, 2011

(86) PCT No.: PCT/JP2011/065151
§ 371 (c)(1),
(2), (4) Date: Dec. 31, 2012

(87) PCT Pub. No.: WO2012/005178
PCT Pub. Date: Jan. 12, 2012

(65) Prior Publication Data
US 2013/0098702 A1    Apr. 25, 2013

(30) Foreign Application Priority Data
Jul. 5, 2010   (JP) .................................. 2010-152614

(51) Int. Cl.
| B60K 17/356 | (2006.01) |
| F16H 61/435 | (2010.01) |
| F16H 61/456 | (2010.01) |
| F16H 61/425 | (2010.01) |
| B60K 17/344 | (2006.01) |

(52) U.S. Cl.
CPC ............ *B60K 17/356* (2013.01); *F16H 61/435* (2013.01); *F16H 61/456* (2013.01); *B60K 17/344* (2013.01); *F16H 61/425* (2013.01)
USPC ...................................................... 180/242

(58) Field of Classification Search
USPC ........................................................ 180/242
See application file for complete search history.

(56) References Cited

U.S. PATENT DOCUMENTS

| 6,889,793 B2 | 5/2005 | Okada et al. |
| 2011/0088545 A1* | 4/2011 | Sasahara et al. ................ 91/505 |
| 2011/0139532 A1* | 6/2011 | Sashikuma et al. ........... 180/242 |

FOREIGN PATENT DOCUMENTS

| JP | 64-004535 A | 1/1989 |
| JP | 10-044803 | 2/1998 |

(Continued)

OTHER PUBLICATIONS

International Search Report of Application No. PCT/JP2011/065151, Japanese Patent Office, mailed Aug. 16, 2011 (4) pages.
International Preliminary Report on Patentability of International Application No. PCT/JP2011/065151, Japanese Patent Office, mailed Jan. 5, 2013, 8 pages (including English Translation).

(Continued)

*Primary Examiner* — Joseph M Rocca
*Assistant Examiner* — Felicia L Brittman
(74) *Attorney, Agent, or Firm* — Sterne Kessler Goldstein & Fox P.L.L.C.

(57) ABSTRACT

At least one of first and second hydraulic motor units that drive first and second wheels is of a variable displacement. A volume adjusting mechanism thereof is operated by an electric motor in accordance with manual operation or automatic operation based on difference in turning radius between the first and second wheels. A control device that controls the electric motor includes normal mode that operates the electric motor in accordance with the manual operation or the automatic operation and torque-up mode that fixes the variable displacement hydraulic motor to a first volume larger than a standard volume, and activates the torque-up mode at idling state in which a power source is in operating state and a pump-side volume adjusting mechanism is in neutral state and shifts the torque-up mode to the normal mode when a traveling speed reaches a first speed.

13 Claims, 13 Drawing Sheets

(56) References Cited

FOREIGN PATENT DOCUMENTS

| | | |
|---|---|---|
| JP | 10-044803 A | 2/1998 |
| JP | 2005-132212 A | 5/2005 |
| JP | 2008-249099 A | 10/2008 |
| JP | 2010-105636 A | 5/2010 |

OTHER PUBLICATIONS

Office Action mailed Jan. 31, 2014 for Japanese Patent Appl. No. 2010-152614, 4 pages.

English-language translation of Office Action mailed Jan. 31, 2014 for Japanese Patent Appl. No. 2010-152614, 4 pages.

* cited by examiner

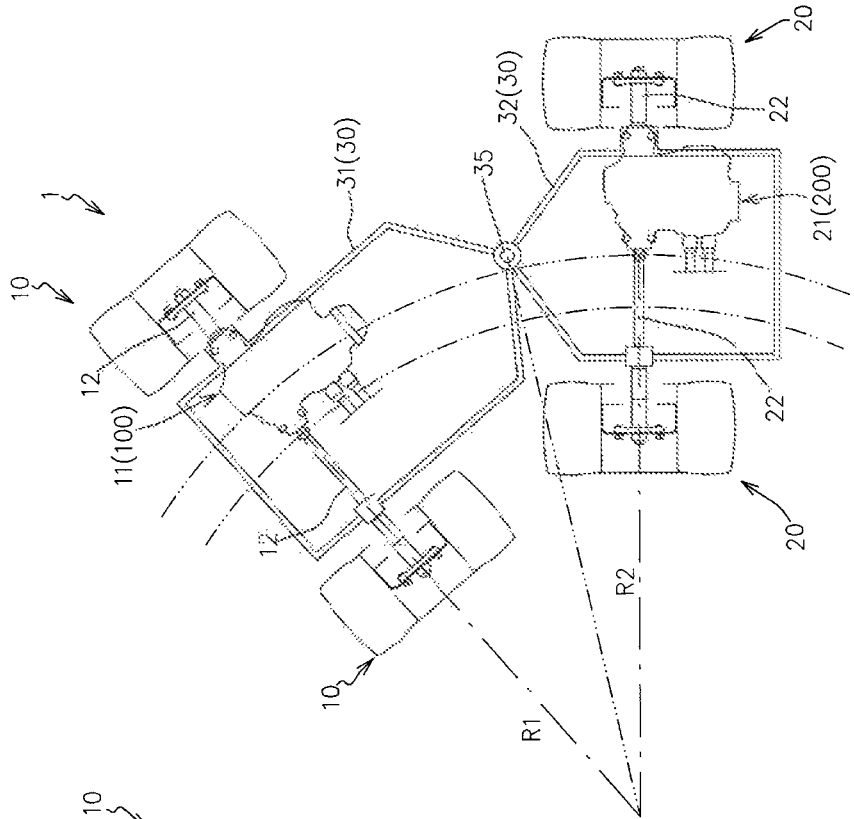
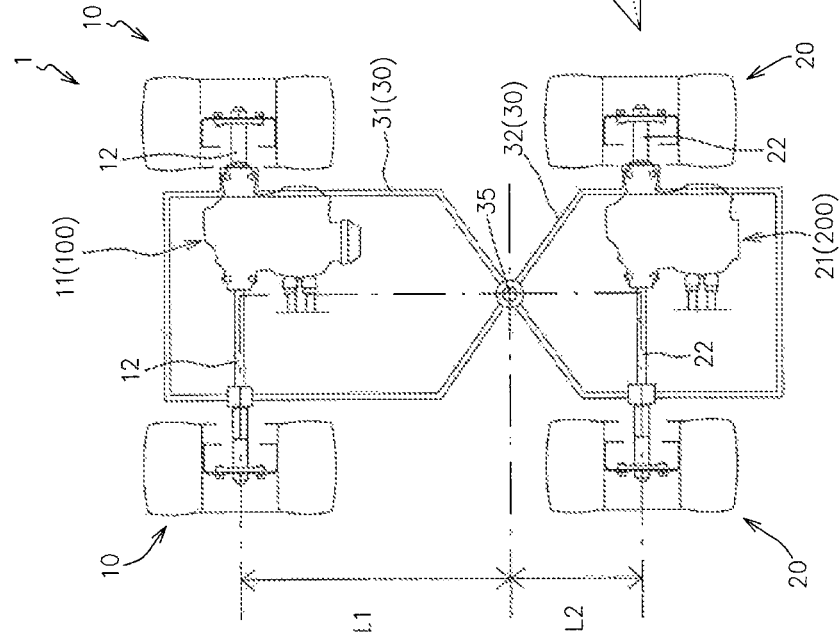

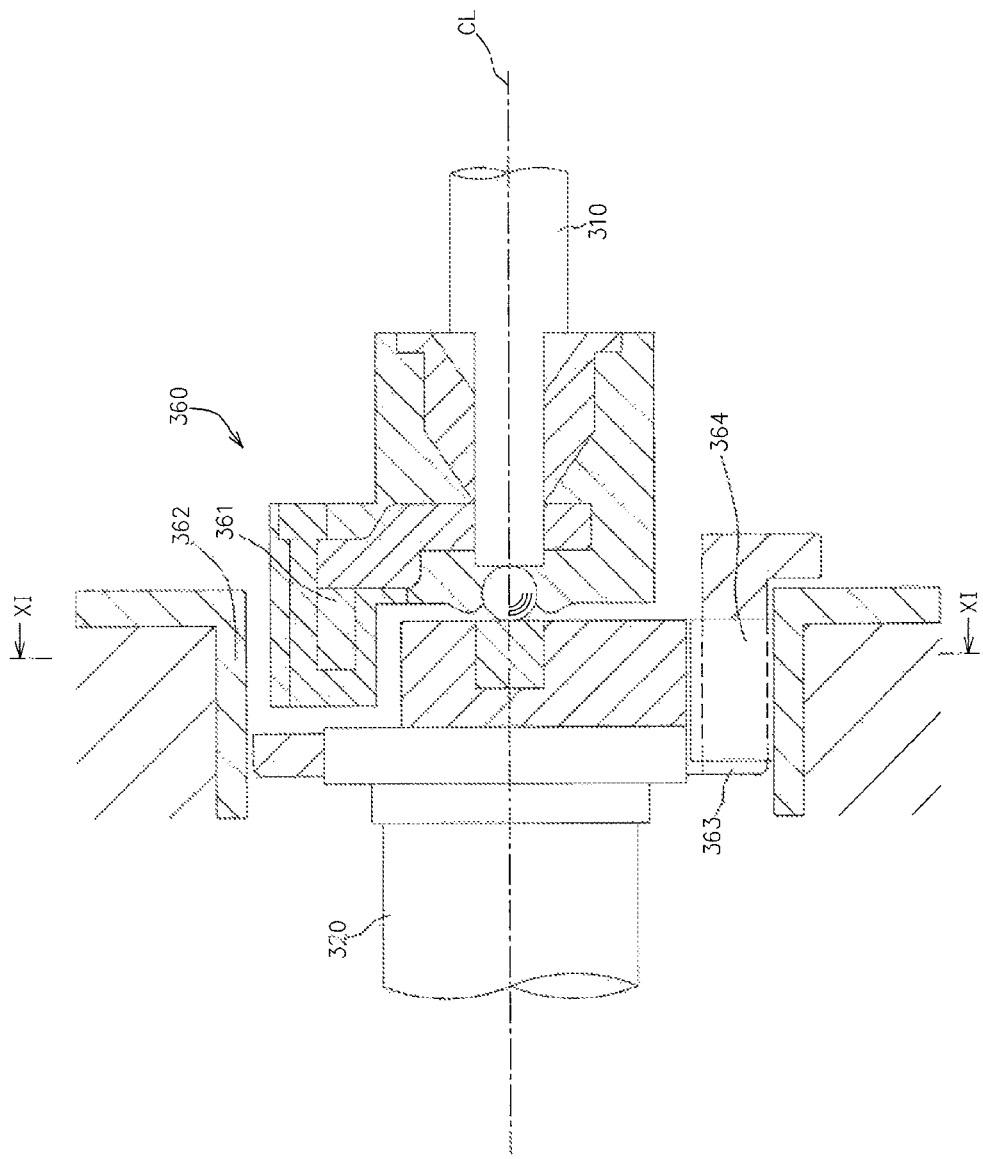

HYDRAULIC FOUR-WHEEL-DRIVE WORK VEHICLE

FIELD OF THE INVENTION

The present invention relates to a hydraulic four-wheel-drive work vehicle including a variable displacement type hydraulic pump unit that is operatively driven by a driving power source, and first and second hydraulic motor units that are fluidly connected to the hydraulic pump unit and respectively and operatively drive first and second wheels positioned on one and the other side in a vehicle longitudinal direction, wherein at least one of the first and second hydraulic motor units is of a variable displacement type.

BACKGROUND ART

In a hydraulic four-wheel-drive work vehicle including a variable displacement hydraulic pump unit, and first and second hydraulic motor units that are fluidly connected to the hydraulic pump unit and respectively and operatively drive first and second wheels positioned on one side and the other side in a vehicle longitudinal direction, in order to widen a speed-change range and/or compensate a difference in turning radius between the first and second wheels, it is useful to utilize a variable displacement hydraulic motor unit as at least one of the first and second hydraulic motor units.

For example, Patent Document 1 that is mentioned below discloses a hydraulic four-wheel-drive work vehicle including front and rear wheels that has a difference in turning radius between them, and front and rear hydraulic motor units that respectively drive the front and rear wheels, wherein one of the first and second hydraulic motor units is of a variable displacement type in order to compensate the difference in turning radius between the first and second wheels.

More specifically, the variable displacement hydraulic motor unit includes a hydraulic motor and a volume adjusting mechanism that varies a suction/discharge amount of the hydraulic motor. In the work vehicle disclosed in Patent Document 1, the volume adjusting mechanism is operated in accordance with a steering angle of the vehicle to vary the suction/discharge amount of the hydraulic motor accordingly, whereby driving speed of one of the front and rear wheels that are operatively driven by the variable displacement hydraulic motor can be increased or decreased in accordance with the difference in turning radius between the front and rear wheels.

As described above, the work vehicle disclosed in Patent Document 1 is configured so that the suction/discharge amount of the variable displacement hydraulic motor unit is varied in accordance with the steering angle of the vehicle, thereby making it possible to drive both the front and rear wheels while preventing slippage of the front and rear wheels when the vehicle makes a turn.

However, the variable displacement hydraulic motor unit disclosed in Patent Document 1 is configured so that the volume adjusting mechanism is mechanically operated. More specifically, a mechanical movement in accordance with the turning movement of the vehicle is transmitted to the volume adjusting mechanism, so that the suction/discharge amount of the hydraulic motor unit is defined in an unambiguous manner in accordance with the steering angle of the vehicle.

Therefore, a situation where the suction/discharge amount of the hydraulic motor unit becomes small at the time when vehicle starts to travel, which requires a large torque for travelling, may happen.

PRIOR ART DOCUMENT

Patent Document

Patent document 1: U.S. Pat. No. 6,889,793

DISCLOSURE OF THE INVENTION

The present invention has been achieved in view of the conventional art described above, and an object thereof is to provide a hydraulic four-wheel-drive work vehicle including a variable displacement hydraulic pump unit that is operatively driven by a driving power source and first and second hydraulic motor units that are fluidly connected to the hydraulic pump unit and operatively and respectively drive first and second wheels arranged on one side and the other side in a vehicle longitudinal direction, at least one of the first and second hydraulic motor units being of a variable displacement type, the hydraulic four-wheel-drive work vehicle being capable of causing the variable displacement hydraulic motor unit to be in a high torque state without a manual operation of an operator at the time when the vehicle starts to travel.

In order to achieve the object, the present invention provides a hydraulic four-wheel-drive work vehicle including a vehicle frame, first and second wheels supported by the vehicle frame on one side and the other side in a vehicle longitudinal direction, respectively, a driving power source supported by the vehicle frame, a variable displacement hydraulic pump unit that is operatively driven by the driving power source, and first and second hydraulic motor units that are fluidly connected to the hydraulic pump unit and operatively and respectively drive the first and second wheels, wherein at least one of the first and second hydraulic motor units is of a variable displacement type, wherein the hydraulic pump unit includes a hydraulic pump operatively driven by the driving power source and a pump-side volume adjusting mechanism varying a volume of the hydraulic pump in accordance with a rotation of a pump-side control shaft around an axis line, and wherein the variable displacement hydraulic motor unit includes a variable displacement hydraulic motor and a motor-side volume adjusting mechanism varying a volume of the variable displacement hydraulic motor between a standard volume and a first volume that is larger than the standard volume in accordance with a rotation of a motor-side control shaft around an axis line, wherein the hydraulic four-wheel-drive work vehicle further includes an electric motor that is operatively connected to the motor-side control shaft so as to rotate it around the axis line and a control device that controls an actuation of the electric motor, wherein the control device includes a normal mode and a torque-up mode, the normal mode controlling the actuation of the electric motor to vary the volume of the variable displacement hydraulic motor in accordance with a manual operation or an automatic operation based on a difference in turning radius between the first and second wheel, the torque-up mode fixing the volume of the variable displacement hydraulic motor to the first volume, and wherein the control device activates the torque-up mode if it determines that the vehicle is in an idling state in which the driving power source is in an operating state and the pump-side volume adjusting mechanism is in a neutral state, and cancels the torque-up mode and activates the normal mode if it determines based on a signal from a traveling-speed sensor that a traveling speed of the vehicle reaches a first speed while prohibiting the torque-up mode from being activated and activating the normal mode if a turning radius of the vehicle exceeds a predetermined first turning angle.

The hydraulic four-wheel-drive work vehicle according to the present invention makes it possible to ensure a significant traveling torque at the time when the vehicle starts to travel to effectively prevent lack of traveling torque at the time when the vehicle starts to travel without a manual operation of an operator.

Also, the hydraulic four-wheel-drive work vehicle according to the present invention makes it possible to securely prevent the torque-up mode from being activated when the vehicle is making a turn, since the torque-up mode is prohibited from being activated and the normal mode is activated when a turning radius of the vehicle exceeds a predetermined first turning angle.

In a first aspect, the first and second wheels are arranged so that a turning radius of the first wheel becomes smaller than that of the second wheel as the turning radius of the vehicle becomes larger, and the first hydraulic motor unit that drives the first wheel is of a variable displacement type.

In this case, the standard volume is set in such a manner as to cause a peripheral speed of the first wheel that is driven by the first hydraulic motor to be substantially same as that of the second wheel that is driven by the second hydraulic motor, and the first volume is set in such a manner as to cause the peripheral speed of the first wheel to be reduced by an amount corresponding to the difference in turning radius between the first and second wheels when the vehicle makes a maximum turn. The normal mode controls the electric motor based on a signal from a turning-angle sensor so that the volume of the first hydraulic motor is set to the standard volume when the vehicle is in a straight-traveling state while the volume of the first hydraulic motor is varied from the standard volume to the first volume as the vehicle is shifted from the straight-traveling state to a maximum-turning state.

For example, the vehicle frame may be of an articulate type including first and second frames that are connected to each other in a swinging manner around a pivot shaft along a substantially vertical direction.

In this case, the second wheel is supported by the second frame, and the first wheel is supported by the first frame in such a manner as that a length in the vehicle longitudinal direction between the first wheel and the pivot shaft becomes longer than a length in the vehicle longitudinal direction between the second wheel and the pivot shaft.

In the first aspect, the control device may be preferably configured so as to cancel the torque-up mode and activate a transition mode rather than the normal mode at the time when the traveling speed reaches the first speed in a state where the torque-up mode is activated, the transition mode controlling the electric motor so that the volume of the first hydraulic motor is varied from the first volume to the standard volume as the traveling speed is increased from the first speed to a second speed that is higher than the first speed, and the control device may be further configured so as to cancel the transition mode and activate the normal mode at the time when the traveling speed reaches the second speed.

Alternatively, the control device may be configured so as to cancel the torque-up mode and activate a transition mode rather than the normal mode at the time when the traveling speed reaches the first speed in a state where the torque-up mode is activated, the transition mode controlling the electric motor so that the volume of the first hydraulic motor is gradually varied from the first volume to the standard volume over a predetermined period of time, and the control device may be further configured so as to cancel the transition mode and activate the normal mode after the predetermined period of time has passed.

In a configuration in which the second hydraulic motor unit that drives the second wheels is of a fixed displacement type, the control device may be configured so as to cancel the torque-up mode and activate the normal mode at the time when the traveling speed reaches a third speed that is lower than the first speed if the control device determines that the vehicle has been shifted from an idling state to a traveling state in one direction in the vehicle longitudinal direction that causes the first wheel to be positioned on a front side in the traveling direction

BRIEF DESCRIPTION OF THE DRAWINGS

[FIG. 1A]
FIG. 1A is a plan view of a hydraulic four-wheel-drive work vehicle according to one embodiment of the present invention, and shows a straight-traveling state.

[FIG. 1B]
FIG. 1B is a plan view of the hydraulic four-wheel-drive work vehicle according to one embodiment of the present invention, and shows a turning state.

FIG. 2 is a hydraulic circuit diagram of the work vehicle shown in FIGS. 1A and 1B.

FIG. 3A is a horizontal cross sectional plan view of a variable displacement hydraulic motor unit provided in the work vehicle.

FIG. 3B is a horizontal cross sectional partial plan view of a modified example of the variable displacement hydraulic motor unit.

FIG. 4 is a cross sectional view taken along line IV-IV in FIG. 3A.

FIG. 5 is a cross sectional view taken along line V-V in FIG. 3A.

FIG. 6 is an end view taken along line VI-VI in FIG. 3A.

FIG. 7 is a cross sectional view taken along line VII-VII in FIG. 3A.

FIG. 8 is a cross sectional view taken along line in FIG. 3A.

FIG. 9 is an exploded view of FIG. 8.

[FIG. 10]
FIG. 10 is a cross sectional view taken along line X-X in FIG. 6.

FIG. 11 is a cross sectional view taken along line XI-XI in FIG. 10.

FIG. 12 is a flowchart of a control device provided in the work vehicle.

EMBODIMENT FOR CARRYING OUT THE INVENTION

Described below is one embodiment of a hydraulic four-wheel-drive work vehicle according to the present invention with reference to the accompanying drawings.

FIGS. 1A and 1B are plan views of a hydraulic four-wheel-drive work vehicle 1 according to the present embodiment, and show a straight-traveling state and a turning state of the work vehicle 1, respectively.

Figure 2:
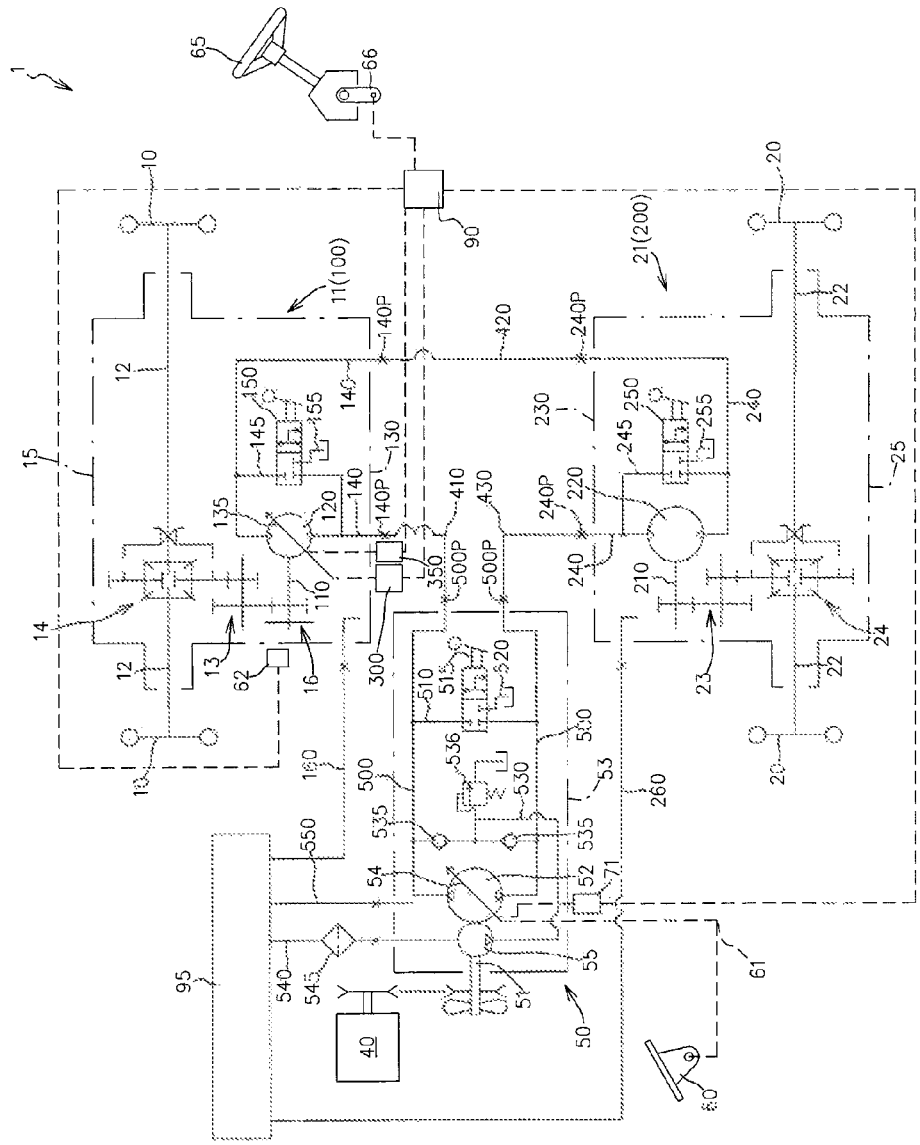
[FIG. 2]

FIG. 2 is a hydraulic circuit diagram of the work vehicle 1.

As shown in FIGS. 1 and 2, the work vehicle 1 includes a vehicle frame 30, first wheels 10 (front wheels in the present embodiment) and second wheels 20 (second wheels in the present embodiment), a driving power source 40, a variable displacement hydraulic pump unit 50, a first hydraulic motor unit 50 and a second hydraulic motor unit 200. The first and second wheels 10, 20 are supported by the vehicle frame 30 on one side and the other side in a vehicle longitudinal direction. The driving power source 40 is supported by the vehicle frame 30. The pump unit 50 is operatively driven by the driving power source 40. The first hydraulic motor unit 100 is fluidly connected to the hydraulic pump unit 50 and operatively drives the first wheels 10. The second hydraulic motor unit 200 is fluidly connected to the hydraulic pump unit 50 and operatively drives the second wheels 20.

The hydraulic pump unit 50 forms an HST in cooperation with the first and second hydraulic motor units 100, 200.

More specifically, as shown in FIG. 2, the hydraulic pump unit 50, the first hydraulic motor unit 100 and the second hydraulic motor unit 200 are fluidly connected with one another in series.

To give a detailed explanation, the hydraulic pump unit 50, the first hydraulic motor unit 100 and the second hydraulic motor unit 200 are fluidly connected with one another so that, on the basis of a case where the vehicle travels forward (that is, on the basis of a case where the hydraulic pump unit 50 is driven in a normal direction), a pressurized fluid discharged from the hydraulic pump unit 50 is first supplied to one (the first hydraulic motor unit 100 in the present embodiment) of the first and second hydraulic motor units 100, 200, the pressurized fluid returned from the one hydraulic motor unit is then supplied to the other one (the second hydraulic motor unit 200 in the present embodiment) of the first and second hydraulic motor units 100, 200, and the pressurized fluid returned from the other one hydraulic motor unit is finally returned to the hydraulic pump unit 50.

In this case, when the vehicle travels rearward (that is, when the hydraulic pump unit 50 is driven in a reverse direction), the pressurized fluid discharged from the hydraulic pump unit 50 is first supplied to the other one hydraulic motor unit (the second hydraulic motor unit 200 in the present embodiment), the pressurized fluid returned from the other one hydraulic motor unit is then supplied to the one hydraulic motor unit (the first hydraulic motor unit 100 in the present embodiment), and the pressurized fluid returned from the one hydraulic motor unit is finally returned to the hydraulic pump unit 50.

As explained earlier, the hydraulic pump unit 50 is of a variable displacement type, and functions as a main speed-change device of the work vehicle 1.

More specifically, as shown in FIG. 2, the hydraulic pump unit 50 includes a pump shaft 51, a hydraulic pump 52, a pump housing 53 and a pump-side volume adjusting mechanism 54. The pump shaft 51 is operatively connected to the driving power source 40. The hydraulic pump 52 is supported by the pump shaft 51 in a relatively non-rotatable manner with respect thereto. The pump housing 53 accommodates the hydraulic pump 52 and supports the pump shaft 51 in a rotatable manner around its axis line. The pump-side volume adjusting mechanism 54 varies the suction/discharge amount of the hydraulic pump 52 to function as the main speed-change device.

As shown in FIG. 2, the pump housing 53 is provided with paired pump-side operation fluid lines 500 that have first ends fluidly connected to the hydraulic pump 52 and second ends opened at an outer surface of the pump housing 53 to form paired pump-side connecting ports 500P.

As shown in FIG. 2, the pump housing 53 is further provided with a pump-side bypass line 510, a pump-side drain line 520 and a pump-side bypass valve 515. The pump-side bypass line 510 fluidly connects the paired pump-side operation fluid lines 500. The pump-side drain line 520 has a first end fluidly connected to the pump-side bypass line 510 and a second end opened into an internal space of the pump housing.

The pump-side bypass valve 515 selectively takes a shutoff position or a bypass/drain position. When being positioned at the shutoff position, the pump-side bypass valve 515 causes the pump-side bypass line 510 to be in a shutoff state and fluidly disconnects the pump-side drain line 520 from the pump-side bypass line 510. When being positioned at the bypass/drain position, the pump-side bypass valve 515 causes the pump-side bypass line 510 to be in a connecting state and fluidly connects the pump-side drain line 520 to the pump-side bypass line 510.

The pump housing 53 is further provided with a charge line 530.

More specifically, as shown in FIG. 2, the hydraulic pump unit 50 includes a charge pump 55 operatively driven by the pump shaft 51, in addition to the above-explained components.

The charge line 530 has a first end fluidly connected to a discharge side of the charge pump 55 and second ends fluidly to the paired pump-side operation fluid lines 500 via paired check valves 535.

FIG. 2 also shows a charge relief valve with a reference numeral 536 for setting a hydraulic pressure of the charge line 530, an oil tank with a reference numeral 95 that functions as an oil source for the charge pump 55, and a filter with a reference numeral 545 that is interposed in a charge suction line 540 fluidly connecting the oil tank 95 to a suction side of the charge pump 55.

Further, FIG. 2 shows a drain line with a reference numeral 550 that fluidly connects the internal space of the pump housing 53 to the oil tank 95.

The pump-side volume adjusting mechanism 54 is operated in accordance to a manual operation on a speed-change operating member 60 provided in the work vehicle 1.

For example, an amount of the manual operation on the speed-change operating member 60 can be transmitted to the pump-side volume adjusting mechanism 54 through a mechanical linkage mechanism 61 (see FIG. 2).

Alternatively, the hydraulic pump unit 50 may be provided with a pump-side actuator (not shown) such as an electric motor that operates the pump-side volume adjusting mechanism 54, and the work vehicle may be further provided with a speed-change operating sensor (not shown) that detects an amount of a manual operation on the speed-change operating member 60, a speed-change actuating sensor (not shown) that detects an actuating state of the pump-side actuator, and a control device 90. In the alternative configuration, the control device 90 controls the pump-side actuator based on signals from the speed-change operating sensor and the speed-change actuating sensor so that the pump-side volume adjusting mechanism 54 is operated in accordance with the amount of the manual operation on the speed-change operating member 60.

For example, the pump-side volume adjusting mechanism 54 may include a pump-side control shaft (not shown) that is rotatable around its axis line, and a pump-side movable swash plate (not shown) operatively connected to the pump-side control shaft so as to be tilted around a swing center line in accordance with a rotation of the pump-side control shaft around the axis line.

At least one of the first and second hydraulic motor units 100, 200 is of a variable displacement type.

A variable displacement hydraulic motor unit functions as a sub speed-change device for widening a speed-change range in the work vehicle 1, or a speed-change device for varying a driving speed of a corresponding first or second wheels 10, 20 in accordance with a difference in turning radius between the first and second wheels 10, 20.

In the present embodiment, the first hydraulic motor unit 100 is of a variable displacement type, and is configured to vary the driving speed of the corresponding first wheel 10 in accordance with the difference in turning radius between the first and second wheels 10, 20.

More specifically, as shown in FIGS. 1A and 1B, in the work vehicle 1, the first and second wheels 10, 20 are arranged so that the first wheels 10 have a turning radius that becomes smaller than that of the second wheels 20 in accordance with a turning angle of the vehicle.

The first hydraulic motor unit 100 that operatively drives the first wheel 10 is of a variable displacement type in order to vary the driving speed of the corresponding first wheel 10 in accordance with the difference in turning radius.

The work vehicle 1 according to the present embodiment is of an articulated type that includes, as the vehicle frame 30, first and second frames 31, 32 connected to each other in a swinging manner around a pivot shaft 35 along a substantially vertical direction, as shown in FIGS. 1A and 1B.

The second wheels 20 are supported by the second frame 32, and the first wheels 10 are supported by the first frame 31 in such a manner as that a length L1 in the vehicle longitudinal direction between the first wheels 10 and the pivot shaft 32 becomes longer than a length L2 in the vehicle longitudinal direction between the second wheels 20 and the pivot shaft 35.

According to the configuration, a turning radius R1 of the first wheels 10 becomes smaller than a turning radius R2 of the second wheels 20, and the difference in turning radius between the first and second wheels 10, 20 becomes larger as the turning angle of the vehicle becomes larger.

The work vehicle that has the difference in turning radius between first and second wheels arranged on one side and the other side in the vehicle longitudinal direction may be embodied by a work vehicle that includes a rigid vehicle frame and front and rear wheels supported by the rigid vehicle frame at front and rear portions thereof, wherein one of the front and rear wheels are steering wheels, in addition to the articulated work vehicle 1.

The second hydraulic motor unit 200 will be now explained.

In the present embodiment, the second hydraulic motor unit 200 is of a fixed displacement type.

More specifically, as shown in FIG. 2, the second hydraulic motor unit 200 includes a second hydraulic motor 220, a second motor shaft 210 and a second motor housing 230. The second hydraulic motor 220 is of a fixed displacement type that has a fixed suction/discharge amount. The second motor shaft 210 supports the second hydraulic motor 220 in a relatively non-rotatable manner with respect thereto. The second motor housing 230 accommodates the second hydraulic motor 220 and supports the second motor shaft 210 in a rotatable manner around its axis line.

The second motor housing 230 is provided with paired second motor-side operation fluid lines 240 that have first ends fluidly connected to the second hydraulic motor and second ends opened at an outer surface of the second motor housing to form paired second motor-side connecting ports 240P.

As shown in FIG. 2, the second motor housing 230 is further provided with a second motor-side bypass line 245, a second motor-side drain line 255 and a second motor-side bypass valve 250. The second motor-side bypass line 245 fluidly connects the paired second motor-side operation fluid lines 240. The second motor-side drain line 255 has a first end fluidly connected to the second motor-side bypass line 245 and a second end opened into an internal space of the second motor housing 230.

The second motor-side bypass valve 250 can selectively take a shutoff position or a bypass/drain position. When being positioned at the shutoff position, the second motor-side bypass valve 250 causes the second motor-side bypass line 245 to be in a shutoff state and fluidly disconnects the second motor-side drain line 255 from the second motor-side bypass line 245. When being positioned at the bypass/drain position, the second motor-side bypass valve 250 causes the second motor-side bypass line 245 to be in a connecting state and fluidly connects the second motor-side drain line 255 to the second motor-side bypass line 245.

A reference numeral 260 denotes a drain line that fluidly connects the oil tank and the internal space of the second motor housing 230.

As shown in FIG. 2, in the present embodiment, the second hydraulic motor unit 200 forms a second axle-driving device 21 that drives the second wheels 20.

More specifically, the second axle-driving device 21 includes paired right and left second axles 22, a second differential gear mechanism 24 and a second axle housing 25, in addition to the second hydraulic motor unit 200. The paired second axles 22 are connected to the paired second wheels 20, respectively. The second differential gear mechanism 24 receives rotational power from the second motor shaft 210 through a second reduction gear train 23, and transmits the same to the paired second axles 22 in a differential manner to each other. The second axle housing 25 accommodates the second reduction gear train 23 and the second differential gear mechanism 24, and supports the paired second axles 22 in a rotatable manner around a respective axis line.

The second axle housing 25 and the second motor housing 230 are integrally formed with each other.

The first hydraulic motor unit 100 of a variable displacement type will be next explained.

Figure 3A:
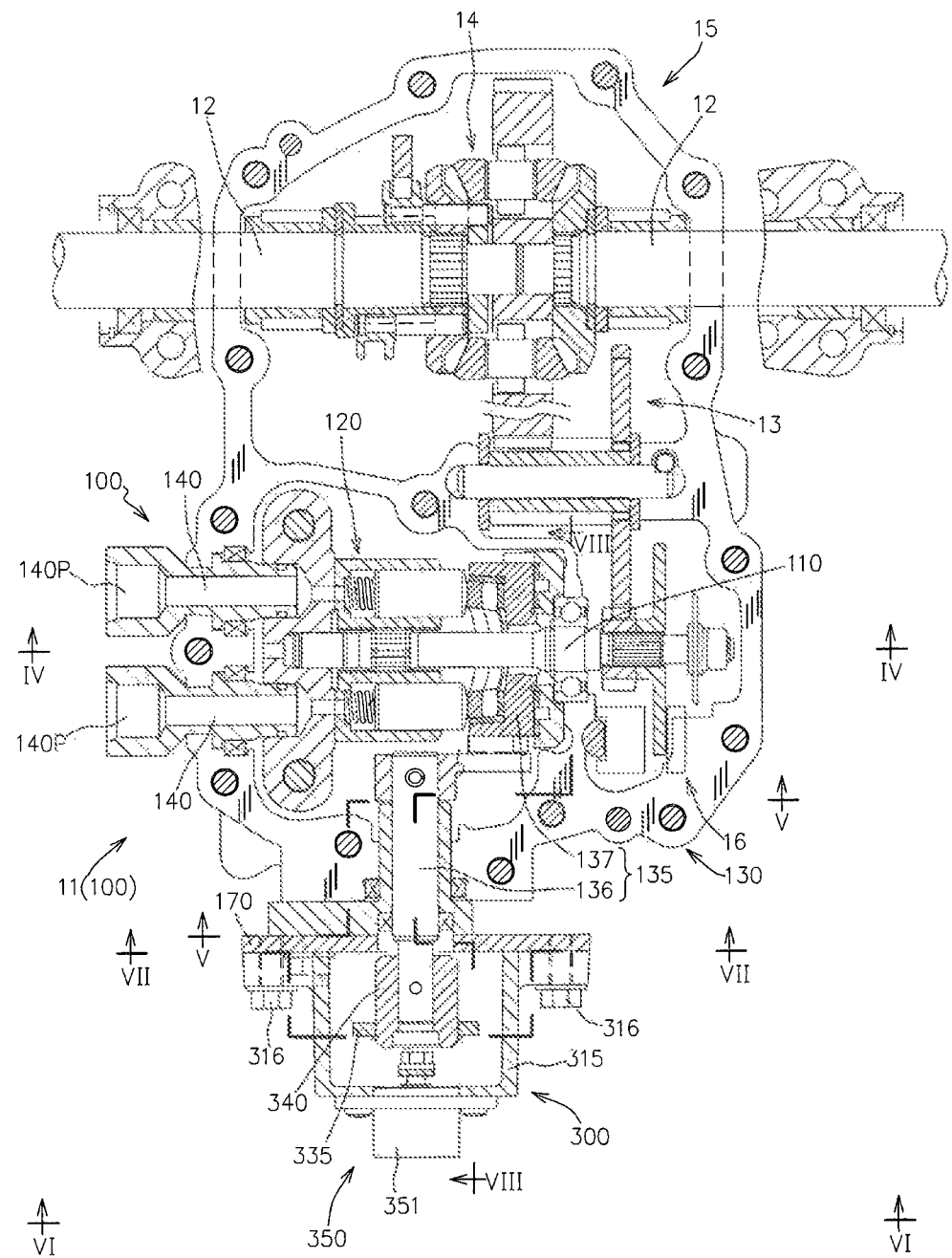
[FIG. 3A]

FIG. 3A is a horizontal cross sectional plan view of the first hydraulic motor unit 100.

Figure 4:
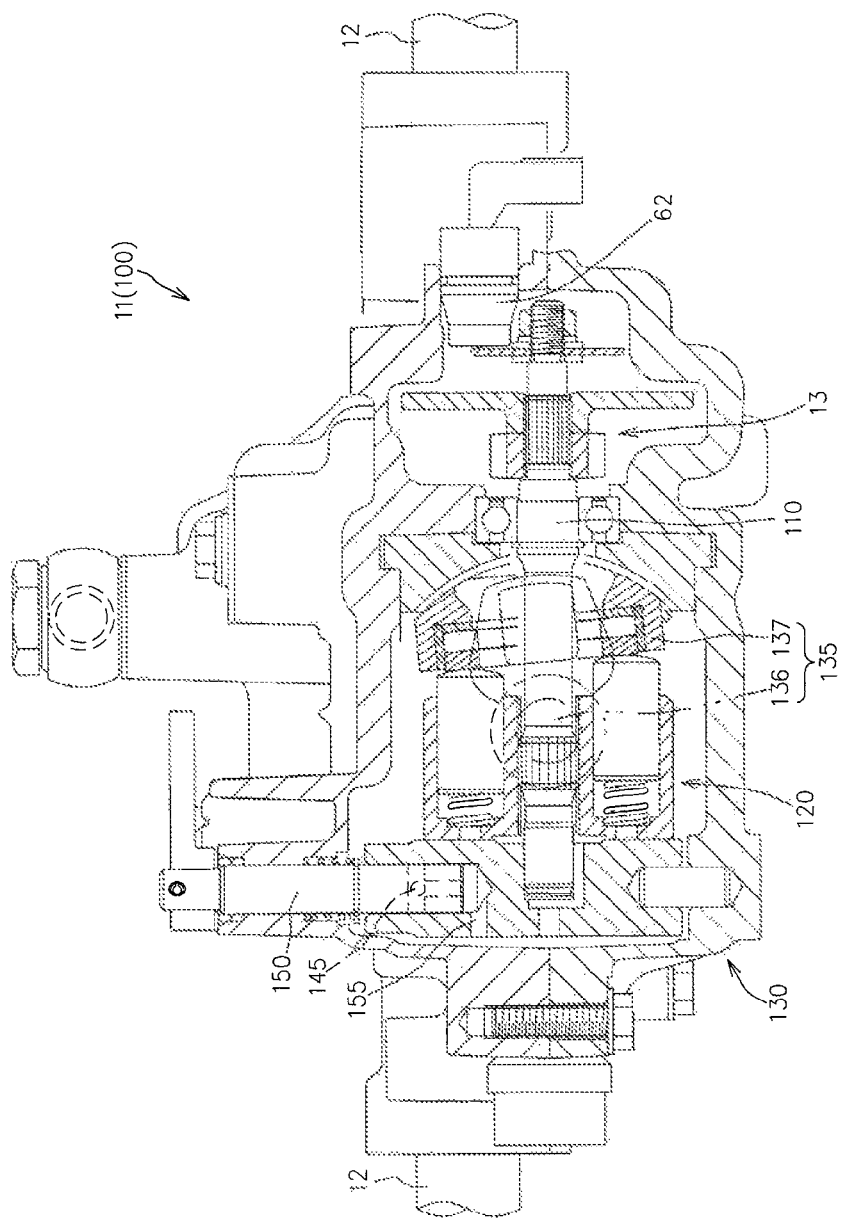
[FIG. 4]

FIG. 4 is a cross sectional view taken along line IV-IV in FIG. 3A.

As shown in FIGS. 2, 3A and 4, the hydraulic first motor unit 100 includes a first hydraulic motor 120, a first motor shaft 110, a first motor housing 130 and a motor-side volume adjusting mechanism 135. The first motor shaft 110 supports the first hydraulic motor 120 in a relatively non-rotatable manner with respect thereto. The first motor housing 130 accommodates the first hydraulic motor 120 and supports the first motor shaft 110 in a rotatable manner around its axis line. The motor-side volume adjusting mechanism 135 varies a suction/discharge amount of the first hydraulic motor 120.

The first motor housing 130 is provided with paired first motor-side operation fluid lines 140 that have first ends fluidly connected to the first hydraulic motor 120 and second ends opened at an outer surface of the first motor-housing 130 to form paired first motor-side connecting ports 140P.

As shown in FIG. 2, one of the paired first motor-side connecting ports 140P is fluidly connected to one of the paired pump-side connecting ports 500P through a pump/first motor line 410, the other one of the paired first motor-side connecting ports 140P is fluidly connected to one of the paired second motor-side connecting ports 240P through a first motor/second motor line 420, and the other one of the paired second motor-side connecting ports 240P is fluidly connected to the other one of the paired pump-side connecting ports 500P through a pump/second motor line 430.

In other words, in the present embodiment, the hydraulic pump 52, the first hydraulic motor 120 and the second hydraulic motor 220 are fluidly connected to one another in series, so that the first hydraulic motor 120 that operatively drives the first wheels 10 and the second hydraulic motor that operatively drives the second wheels 20 are fluidly driven by the hydraulic pump 52 in a synchronized manner to each other.

As shown in FIGS. 2 and 4, the first motor housing 130 is further provided with a first motor-side bypass line 145, a first motor-side drain line 155 and a first motor-side bypass valve 150. The first motor-side bypass line 145 fluidly connects the paired first motor-side operation fluid lines 140. The first motor-side drain line 155 has a first end fluidly connected to the first motor-side bypass line 145 and a second end opened into an internal space of the first motor housing 130.

The first motor-side bypass valve 150 can selectively take a shutoff position or a bypass/drain position. When being positioned at the shutoff position, the first motor-side bypass valve 150 causes the first motor-side bypass line 145 to be in a shutoff state and fluidly disconnects the first motor-side drain line 155 from the first motor-side bypass line 145. When being positioned at the bypass/drain position, the first motor-side bypass valve 150 causes the first motor-side bypass line 145 to be in a connecting state and fluidly connects the first motor-side drain line 155 to the first motor-side bypass line 145.

A reference numeral 160 denotes a drain line that fluidly connects the oil tank 95 and the internal space of the first motor housing 130.

Figure 5:
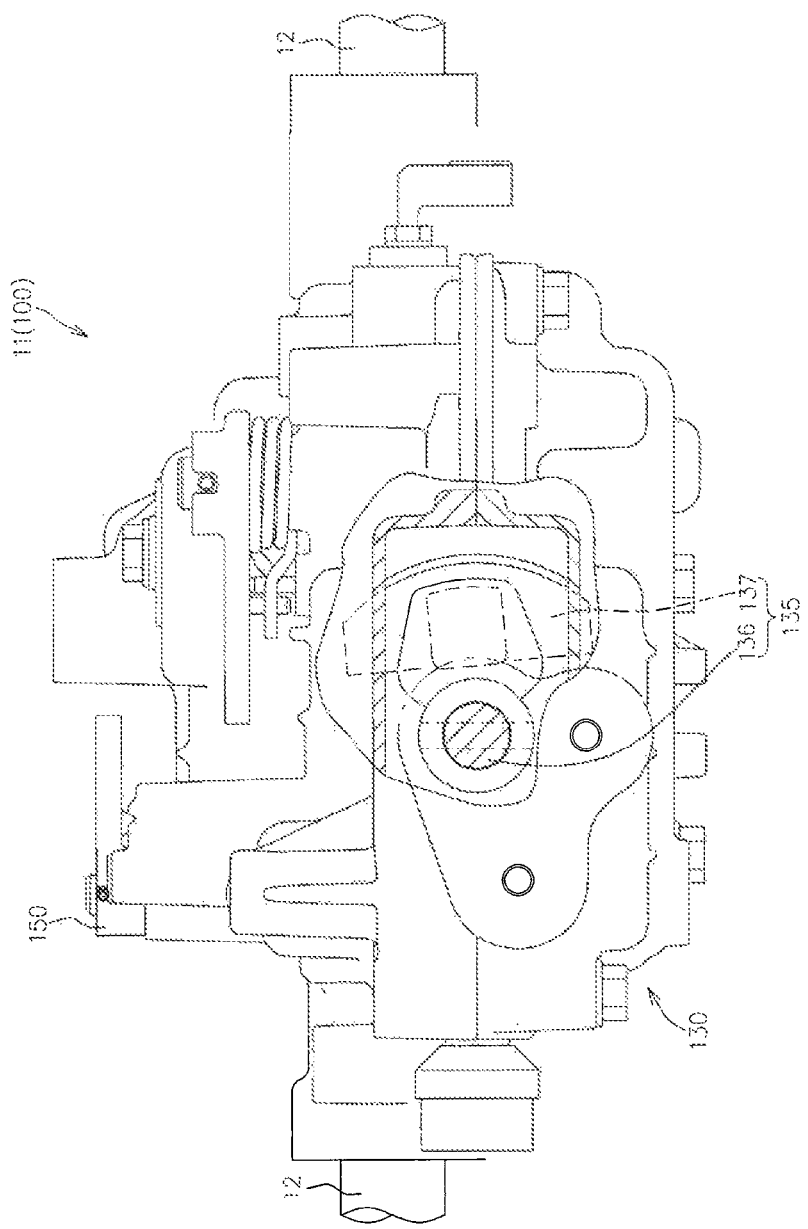
[FIG. 5]

FIG. 5 is a cross sectional view taken along line V-V in FIG. 3A.

As shown in FIGS. 3A and 5, the motor-side volume adjusting mechanism 135 includes a motor-side control shaft 136 that is directly or indirectly supported by the first motor housing 130 in a rotatable around its axis line in a state where a first end of the control shaft is extended outwardly from the first motor housing 130. The motor-side volume adjusting mechanism 135 varies the suction/discharge amount of the first hydraulic motor in accordance with a rotation of the motor-side control shaft 136 around the axis line.

As shown in FIGS. 3A and 4, in the present embodiment, the first hydraulic motor 120 is of an axial piston type.

Therefore, as shown in FIGS. 3A to 5, the motor-side volume adjusting mechanism 135 includes a motor-side movable swash plate 137 that can be tilted around a swing center line, in addition to the motor-side control shaft 136. The motor-side movable swash plate 137 increases or decreases the suction/discharge amount of the first hydraulic motor 120 in accordance with a tilted position around the swing center line.

The motor-side movable swash plate 137 is connected to the motor-side control shaft 136 so as to be tilted around the swing center line in accordance with the rotation of the motor-side control shaft 136 around the axis line.

As shown in FIGS. 2 and 3A, the first hydraulic motor unit 100 according to the present embodiment forms a first axle-driving device 11 that drives the paired first wheels 10.

More specifically, the first axle-driving device 11 includes paired right and left first axles 12, a first differential gear mechanism 14 and a first axle housing 15, in addition to the first hydraulic motor unit 100. The paired first axles 1 are connected to the paired first wheels 10, respectively. The first differential gear mechanism 14 receives rotational power from the first motor shaft 110 through a first reduction gear train 13, and transmits the same to the paired first axles 12 in a differential manner to each other. The first axle housing 15 accommodates the first reduction gear train 13 and the first differential gear mechanism 14, and supports the paired first axles 22 in a rotatable manner around a respective axis line.

The first axle housing 15 and the first motor housing 130 are integrally formed with each other to form a single first housing.

In the present embodiment, as shown in FIGS. 2 and 3A, the first axle-driving device 11 is further provided with a brake mechanism 16 that can selectively apply a braking force to a travelling power transmission path extending from the first motor shaft 110 until the first axles 12.

In a preferable configuration, the brake mechanism 16 applies the braking force to a component that is positioned on an upstream side of the first reduction gear train 13 in a power transmitting direction.

The preferable configuration makes it possible to downsize the brake mechanism 16.

In the present embodiment, as shown in FIG. 3A, the brake mechanism 16 is configured so as to apply the braking force to the first motor shaft 16.

Figure 3B:
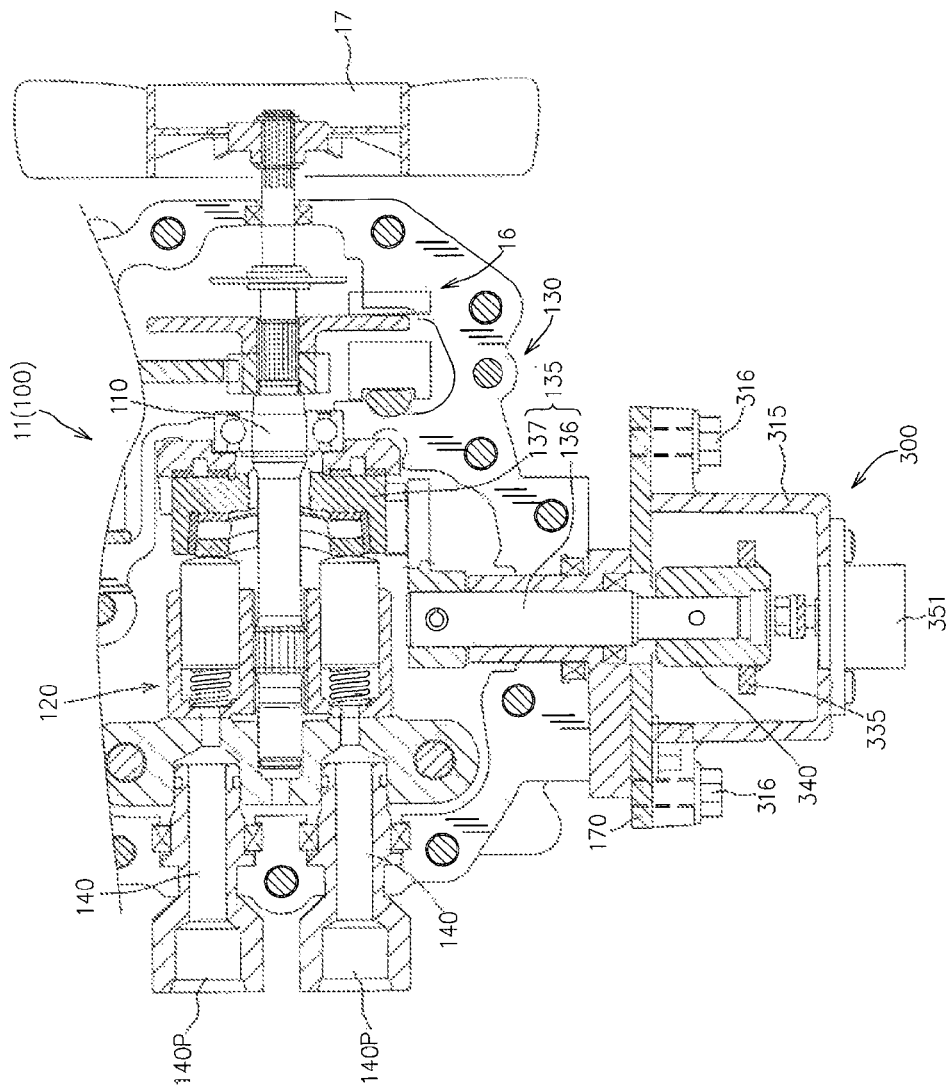
[FIG. 3B]

For example, as shown in FIG. 3B, it is possible to have a first end of the first motor shaft 110 extending outward from the first housing 130 and arrange a cooling fan 17 supported by the outward-extending portion of the first motor shaft 110.

The configuration makes it possible to effectively cool the first axle-driving device 11 including the first hydraulic motor unit 100.

Figure 6:
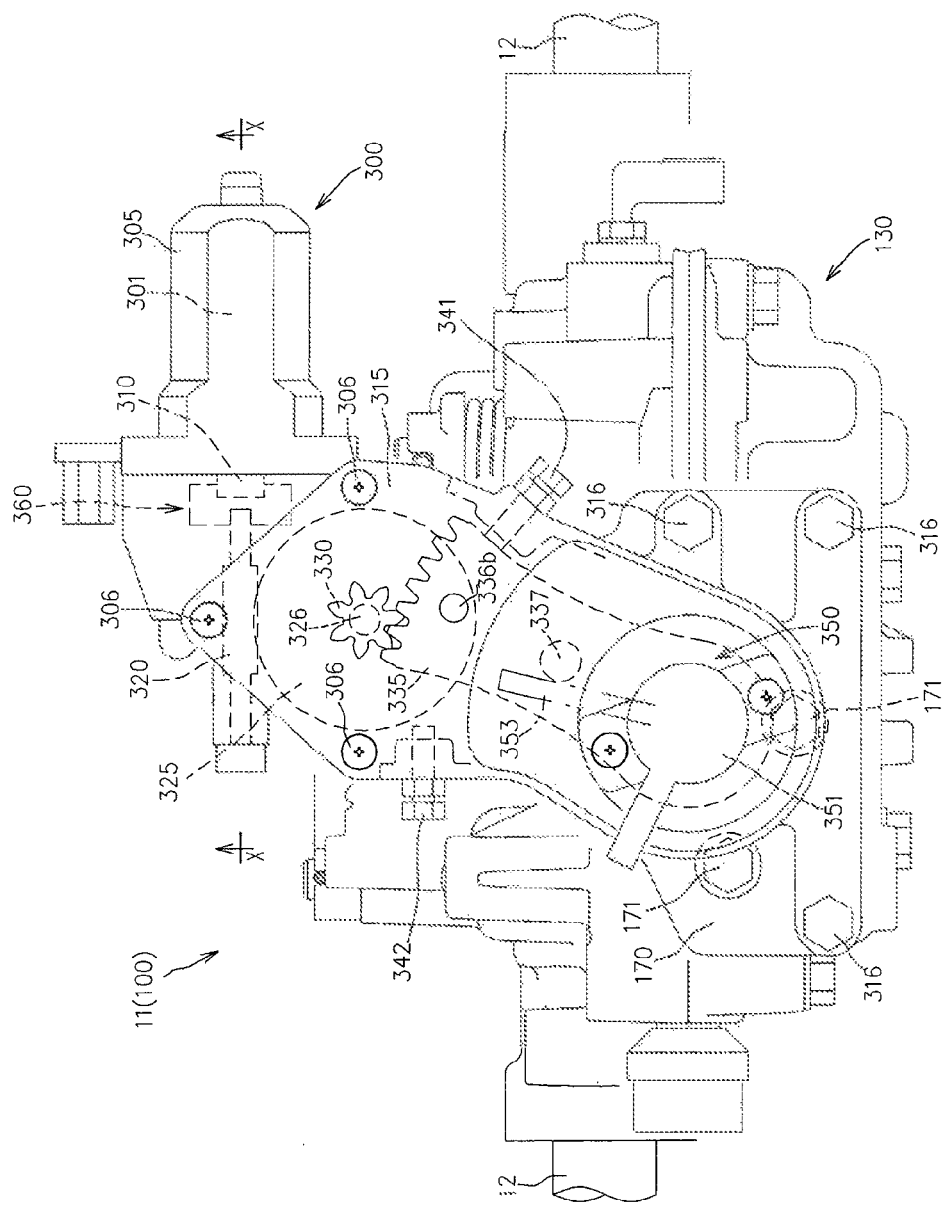
[FIG. 6]

FIG. 6 is an end view taken along line VI-VI in FIG. 3A.

Figure 7:
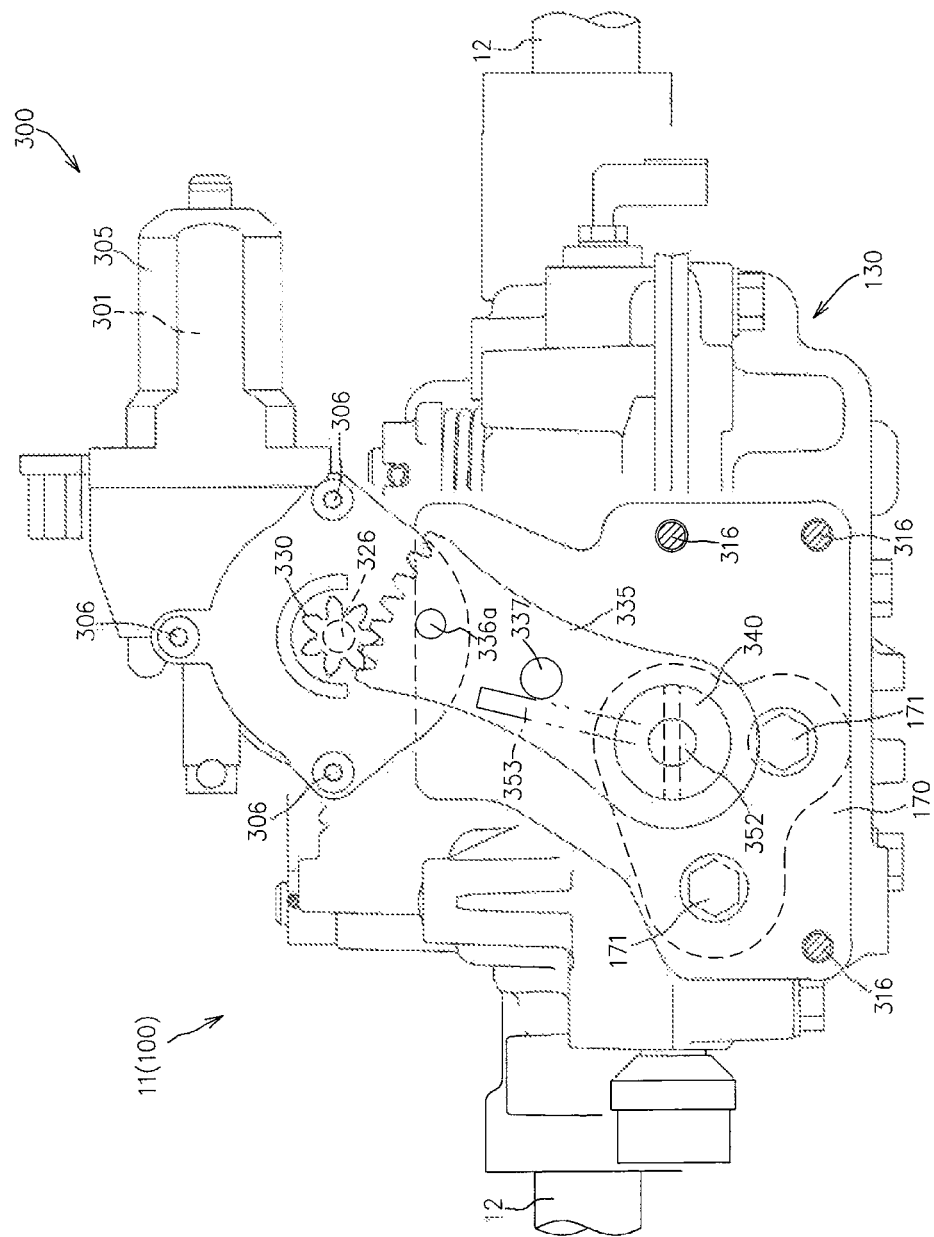
[FIG. 7]
Figure 8:
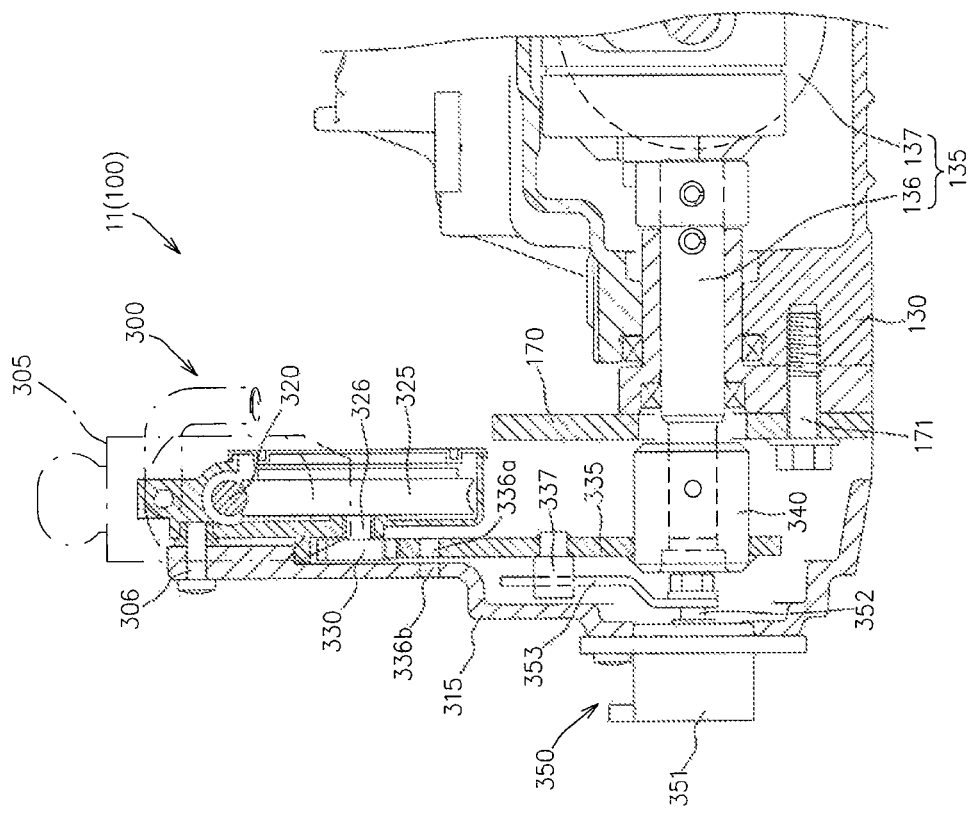
[FIG. 8]

Further, FIGS. 7 and 8 are cross sectional views taken along lines VII-VII and VIII-VIII in FIG. 3A, respectively.

As shown in FIGS. 2 and 6 to 8, the work vehicle 1 according to the present embodiment further includes an electric motor 300 that operatively drives the motor-side control shaft 136, and a control device 90 that controls an actuation of the electric motor 300.

As shown in FIGS. 6 and 7, the electric motor 300 includes an electric motor main body 301 that is electrically controlled, an electric motor case 305 that accommodates the electric motor main body 301, and an electric motor main body output shaft 310 that is rotated around an axis line by the electric motor main body 305.

The electric motor case 305 is directly or indirectly mounted to the first motor housing 130 in a detachable manner.

In the present embodiment, the electric motor case 305 is mounted to the first motor housing 130 via an electric motor cover 315.

More specifically, as shown in FIGS. 6 and 8, the work vehicle 1 further includes the electric motor cover 315 to which the electric motor case 305 can be connected and which is connected to the first motor housing 130.

In the present embodiment, as shown in FIGS. 3A and 6-8, a plate member 170 having an opening into which the motor-side control shaft 136 is inserted is detachably connected to the first motor housing 130 via a fastening member such as bolt The electric motor cover 315 to which the electric motor case 305 has been connected via fastening member 306 such as bolt is connected to the plate member 170 via fastening member 316 such as bolt.

In the work vehicle 1 according to the present embodiment, the electric motor 300 is mounted to the first motor housing 130 so that electric motor main body output shaft 310 is operatively connected to the first end of the motor-side control shaft 136.

That is, in the work vehicle 1, the rotation of the electric motor main body output shaft 310 causes the motor-side control shaft 136 to be rotated around the axis line, thereby varying the suction/discharge amount of the first hydraulic motor 120.

According to the thus configured work vehicle 1, by electrically controlling the electric motor main body 301 in accordance with the manual operation amount of a steering operation member 65 provided in the work vehicle 1, it is possible to realize an actuation of the motor-side volume adjusting mechanism 135 in accordance with the manual operation of the steering operation member 65 without mechanically connecting the steering operation member 65 and the motor-side volume adjusting mechanism 135.

Therefore, it can be achieved to vary the suction/discharge amount of the first hydraulic motor 120 in accordance with the manual operation of the steering operation member 65, without arranging a complex mechanical linkage structure.

Figure 9:
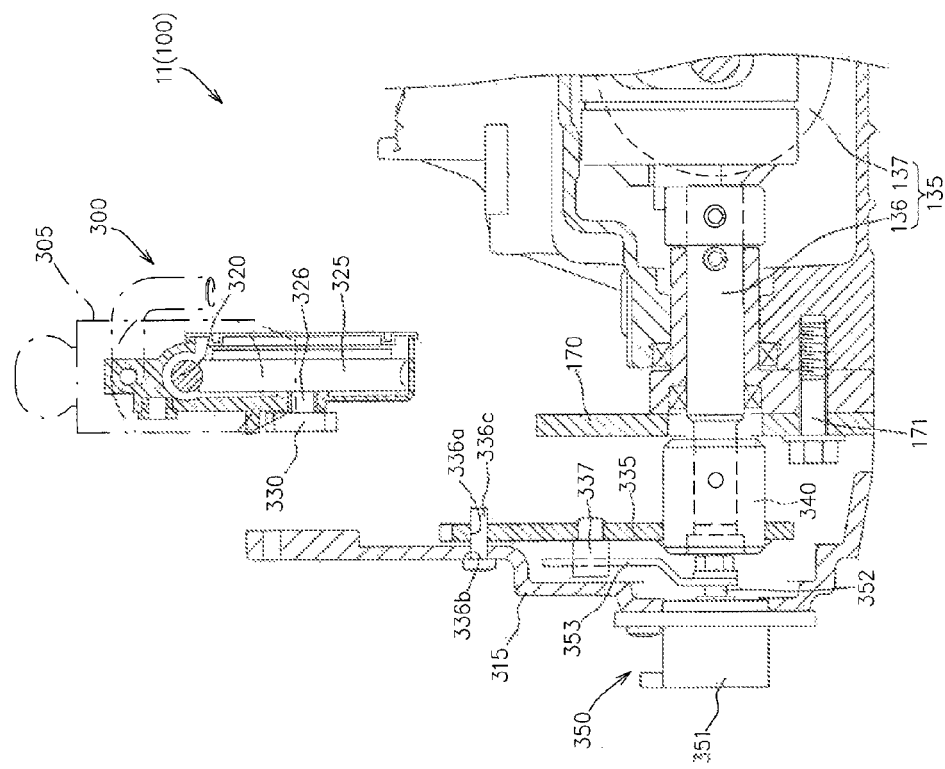
[FIG. 9]

FIG. 9 is an exploded cross sectional view in which the electric motor 300 is separated from the electric motor cover 315.

As shown in FIGS. 6 to 9, in the present embodiment, the electric motor 300 is connected to the motor-side volume adjusting mechanism 135 through an operation shaft 340 connected to the motor-side volume adjusting mechanism 135 and a sector gear 335 connected to the operation shaft 340.

More specifically, the operation shaft 340 is connected to the first end of the motor-side control shaft 136 in a relatively non-rotatable manner around an axis line with respect thereto.

The sector gear 335 extends in a direction orthogonal to the motor-side control shaft 136 in a state where a proximal end of the sector gear 135 is connected to the operation shaft 340, and has a gear portion arranged at a free end.

As shown in FIG. 6, the electric motor 300 includes a worm shaft 320, a transmission gear 325, a transmission shaft 326 and an electric motor output gear 330, in addition the above-mentioned component. The worm shaft 320 is operatively connected to the electric motor main body output shaft 310. The transmission gear 325 engages with the worm shaft 320. The transmission shaft 326 supports the transmission gear 325 in a relatively non-rotatable manner with respect thereto. The electric motor output gear 330 is supported by the transmission shaft 326 in a relatively non-rotatable manner with respect thereto. In the electric motor 300, the electric motor output gear 330 engages with the sector gear 335 in accordance with a connection of the electric motor case 305 to the electric motor cover 315.

The configuration makes it possible that the electric motor main body output shaft 310 is operatively connected to the motor-side control shaft 136 without fault when the electric motor 300 is mounted to the electric motor cover 315 while allowing the electric motor 300 to be easily mounted to and detached from the electric motor cover 315.

As shown FIG. 6, it a preferable configuration, the first hydraulic motor unit 100 may be provided with a first adjusting screw 341 and a second adjusting screw 342. The first adjusting screw 341 is threaded into a fixed member such as the electric motor cover 315 so that a distal end of the first adjusting screw 341 is brought into contact with the sector gear 335 to define a first end of a swinging area in which the sector gear 335 is swung around the operation shaft 340, the first end being positioned on a first side around the operation shaft 340 in a circumferential direction. The second adjusting screw 342 is threaded into the fixed member so that a distal end of the second adjusting screw 342 is brought into contact with the sector gear 335 to define a second end of the swinging area that is positioned on a second side around the operation shaft 340 in a circumferential direction, the second end being opposite to the first end around the operation shaft 340 in the circumferential direction.

The provision of the first and second adjusting screws 341, 342 makes it possible to accurately define a variable displacement range of the first hydraulic motor 120 while having no use of additional component as much as possible.

In the present embodiment, as shown in FIG. 6, the electric motor cover 315 is utilized as the fixed member. However, it is possible, of course, to utilize, as the fixed member, the first motor housing 130 or the plate member 170 fixed to the first motor housing 130.

In the present embodiment, as shown in FIGS. 6 to 9, the sector gear 335 is formed with a through hole 336a that penetrates the sector gear 335 along the axis line direction of the operation shaft 340, and the electric motor cover 315 is formed with a fixing hole 336b at a position that faces the through hole 336a at the time when the sector gear 335 is disposed at a predetermined position around the operation shaft 340.

The configuration makes it possible to fix the sector gear 335 at a predetermined position in the circumferential direction around the operation shaft 340 to fix the suction/discharge amount of the first hydraulic motor 120 to a predetermined suction/discharge amount that corresponds to the predetermined position at the time of a failure of the electric motor 300 or the like, by detaching the electric motor 300 from the electric motor cover 315 and then inserting a fixing pin 336c into the though hole 336a and the fixing hole 336b as shown in FIG. 9.

In a preferable configuration, the fastening member 306 can be utilized as the fixing pin 336c. That is, the fastening member 306 that has been released in order to detach the electric motor 300 from the electric motor cover 315 can be utilized as the fixing pin 336c that is inserted into the through hole 336a and the fixing hole 336b.

As shown in FIGS. 3A, 8 and 9, the work vehicle 1 further includes a sensor unit 350 that detects a rotational amount of the operation shaft 340 around the axis line.

More specifically, as shown in FIGS. 6 to 9, the sensor unit 350 includes a sensor housing 351, a sensor shaft 352, a sensor arm 353, a biasing member (not shown) and a sensor main body (not shown). The sensor housing 351 is mounted to the electric motor cover 315. The sensor shaft 352 is supported by the sensor housing 351 in a rotatable manner around an axis line so as to be arranged coaxially with the operation shaft 340 in a state where the electric motor cover 315 is mounted to the first motor housing 130. The sensor arm 353 has a proximal end connected to the sensor shaft 352 and extends in a direction orthogonal to the operation shaft 340. The biasing member biases a detected body formed by the sensor shaft 352 and the sensor arm 353 toward one side or a first side around the axis line of the sensor shaft 352. The sensor main body detects the rotational amount of the sensor shaft 352 around the axis line.

The sector gear 335 is provided with an engagement pin 337 that is parallel to the operation shaft 340, wherein the sensor arm 353 biased by the biasing member toward the first side around the sensor shaft 352 when the electric motor cover 315 with the sensor unit 350 is connected to the first motor housing 130 engages with the engagement pin 337.

The configuration makes it possible to cause the sensor arm 353 to engage with the engagement pin 337 in such a manner as that the sensor arm 353 is rotated around the sensor shaft 352 in accordance with the rotation of the sector gear 353 around the operation shaft 340 when the electric motor cover 315 with the electric motor 300 and the sensor unit 350 being mounted thereto is connected to the first motor housing 130.

Further, the configuration allows the sensor arm 353 to make a relative movement along the axis line of the sensor shaft 352 with respect to the engagement pin 337 when the electric motor cover 315 with the electric motor 300 and the sensor unit 350 being mounted thereto is detached from the first motor housing 130.

Therefore, the electric motor cover 315 with the electric motor 300 and the sensor unit 350 being mounted thereto can be easily detached from the first motor housing 130 while allowing the sensor unit 350 to detect the position of the sector gear around the operation shaft 340 (that is, the rotational position of the motor-side control shaft 136 around the axis line).

In the present embodiment, as shown in FIG. 6, the electric motor 300 further includes a clutch mechanism 360 interposed between the electric motor main body output shaft 310 and the worm shaft 320. The clutch mechanism 360 allows a rotational power to be transmitted from the electric motor main body output shaft 310 to the worm shaft 320 while preventing the rotational power from being transmitted in a reverse direction.

FIG. 10 is a vertical cross sectional view of the clutch mechanism 360 taken along line X-X in FIG. 6.

Figure 11A:
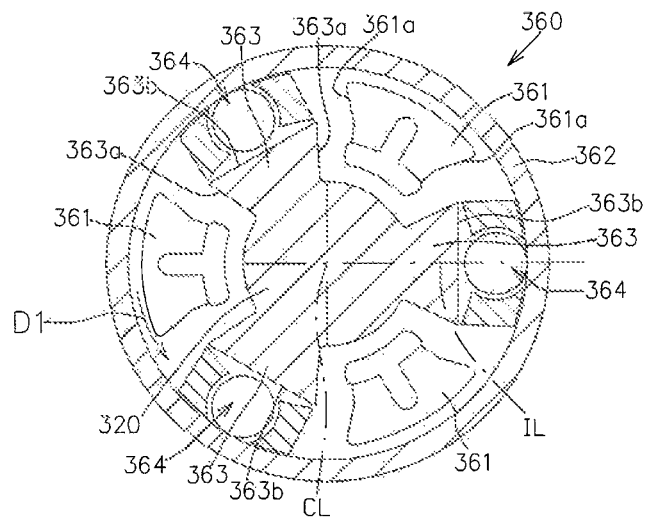
[FIG. 11]
Figure 11B:
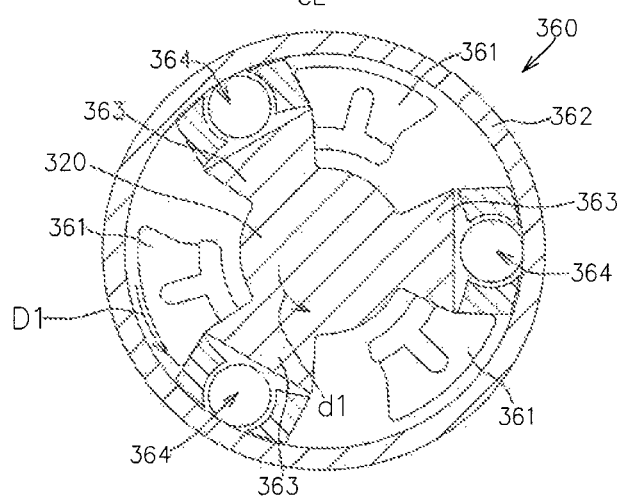

FIG. 11 is a horizontal cross sectional view of the clutch mechanism 360 taken along line XI-XI in FIG. 10.

As shown in FIGS. 10 and 11, the clutch mechanism 360 includes a driving-side arm 361, a collar member 362, a driven-side arm 363 and a contact member 364. The driving-side arm 361 is provided at a distal end of the electric motor main body output shaft 310 so as to extend radially outward. The collar member 362 surrounds the driving-side arm 361. The driven-side arm 363 extends radially outward from an end of the worm shaft 320 that is closer to the electric motor main body output shaft 310. The contact member 364 is disposed between the driven-side arm 363 and the collar member 362 in the radial direction with the axis line of the electric motor main body output shaft 310 and the worm shaft 320 being as a reference.

The driving-side arm 361 has side surfaces facing in a circumferential direction with the axis line of the electric motor main body output shaft 310 being as a reference. The side surfaces are configured so as to press, in the circumferential direction, side surfaces of both the driven-side arm 363 and the contact member 364 that face in the circumferential direction.

The driven-side arm 363 has an outer end surface 363a that faces radially outward. The outer end surface 363a is substantially perpendicular to a virtual line IL connecting a circumferential center of the outer end surface 363b and the axis line CL of the electric motor main body output shaft 310 and the worm shaft 320 when seen along the axis line CL.

The thus configured clutch mechanism 360 is actuated as follows.

When the electric motor main body 301 is rotated in either one direction (hereinafter, referred to as a first direction D1) of a first direction (normal rotation direction that causes the work vehicle 1 to travel forward, for example) and a second direction (reverse rotation direction that causes the work vehicle to travel rearward, for example) around the axis line (see FIG. 11A), the driving-side arm 361 presses both the driven-side arm 363 and the contact member 364 into the first direction D1. Accordingly, the worm shaft 320 is rotated in a direction d1 same as the first direction D1 (see FIG. 11B) so that the movable swash plate 137 is slanted into a direction corresponding to the first direction D1.

The hydraulic pressure of the operational fluid that the first hydraulic motor 120 suctions and discharges functions as power that causes the movable swash plate 137 to be slanted toward a neutral position. Further, in accordance with needs, the hydraulic motor unit may be further provided with a neutral spring that biases the movable swash plate 137 toward the neutral position.

Therefore, when the electric motor 300 is in non-actuation state, the movable swash plate 137 is slightly slanted toward the neutral position against the inertial force of the electric motor 300.

Figure 11C:
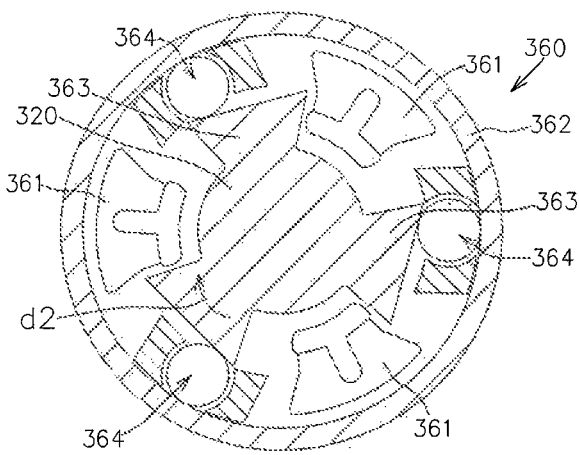

In accordance with this slanting, as shown in FIG. 11C, the worm shaft 320 that is operatively connected to the movable swash plate 137 is rotated in a second direction d2 corresponding to the direction toward the neutral position, while the position of the freely provided contact member 364 being unchanged.

As described above, the outer end surface 363b of the driven-side arm 363 is substantially perpendicular to the virtual line IL connecting the circumferential center of the outer end surface 363b and the axis line CL of the worm shaft 320. Therefore, rotation of the driven-side arm 363 into the second direction d2 causes the contact member 364 to be pressed to the inner circumferential surface of the collar member 362, so that the worm shaft 320 is in a locked state incapable of being rotated (see FIG. 11C).

As a result, it is possible to effectively prevent the movable swash plate 137 from unintentionally slanting from a predetermined slanting position after the electric motor 320 locates the movable swash plate 137 at the predetermined slanting position.

A control method of the control device 90 for the electric motor 300 will be now explained.

As explained earlier, in the work vehicle 1 according to the present embodiment, the first hydraulic motor unit 100 that operatively drives the first wheels 10 and the second hydraulic motor unit 200 that operatively drives the second wheels 20 are fluidly driven by the hydraulic pump unit 50 in a synchronized manner to each other. Also in the work vehicle 1, the first wheels 10 have a turning radius R1 that become smaller than a turning radius R2 of the second wheels 20 as turning angle of the vehicle becomes greater.

The control device 90 has a normal mode (turning mode) that controls the electric motor 300 in such a manner as that the driving speed of the first wheels 10 that are driven by the first hydraulic motor 100 is varied in accordance with the difference in turning radius caused between the first and second wheels 10, 20.

More specifically, the motor-side volume adjusting mechanism 135 of the first hydraulic motor unit 100 is configured so as to change the volume of the first hydraulic motor 120 within a range including a standard volume and a first volume that is larger than the standard volume, the standard volume being set to cause a peripheral speed of the first wheels 10 operatively driven by the first hydraulic motor 120 to be equal to a peripheral speed of the second wheels 20 operatively driven by the second hydraulic motor 220.

For example, if the first wheels 10 and the second wheels 20 have the same outer diameter, the standard volume is become equal to a fixed volume of the second hydraulic motor 220.

In a preferable configuration, the first volume is set to reduce the peripheral speed of the first wheels 10 by a speed that corresponds to a difference in turning radius between the first and second wheels 10, 20 caused at the time when the working vehicle 1 makes a maximum turn.

In the normal mode, the control device 90 actuates the electric motor 300 based on a turning-angle signal from a turning-angle sensor provided in the work vehicle 1 so that the volume of the first hydraulic motor 120 is changed between the standard volume and the first volume in accordance with the turning angle of the vehicle.

More specifically, the control device 90 controls the electric motor 300 so that the volume of the first hydraulic motor 120 becomes the first volume at the time when the work vehicle makes a maximum turn and is changed between the standard volume and the first volume in accordance with the turning angle of the vehicle at the time when the work vehicle 1 is in the turning state between the straight-traveling state and a maximum-turning state.

More specifically, the control device 90 includes a processing part (hereinafter referred to as CPU) and a memory part, wherein the CPU has a processing means that executes arithmetic processing based on a signal from the turning-angle sensor or the like, and the memory part has ROM that stores control program and control data or the like in the normal mode, EEPROM that stores setting value in such a manner as that the setting value or the like is not erased even if the control device is shut down while allowing the setting value or the like to be rewritten, and RAM that temporarily stores data generated by the CPU.

The control device 400 has a control data regarding an actuating status of the electric motor 300 with respect to the turning angle, as the control data stored in the memory part.

The control data may be in form of a computing equation for conversion or LUT (look-up table) or the like, for example.

The turning-angle sensor may be embodied by an operating-side turning-angle sensor 66 (see FIG. 2) or an actuating-side turning-angle sensor that detects a folding angle of the first frame 31 with respect to the second frame 32.

In a case where the work vehicle includes a rigid vehicle frame and front and rear wheels supported by the vehicle frame at front and rear portions in a vehicle longitudinal direction, wherein one of the front and rear wheels are steering wheels, the actuating-side turning-angle sensor is configured so as to detect the steering angle of the steering wheel.

In the work vehicle according to the present embodiment, the control device 90 includes a torque-up mode that keeps the volume of the first hydraulic motor 120 at the first volume, in addition to the normal mode. The control device 90 activates the torque-up mode when the control device 90 judges that the work vehicle is in an idling state in which the driving power source 40 is in an operation state and the pump-side volume adjusting mechanism 54 is in a neutral state, and cancels the torque-up mode and activates the normal mode when the control device 90 judges based on a signal from a traveling-speed sensor 62 (see FIG. 2) that the traveling speed of the vehicle reaches a predetermined first speed.

Figure 12:
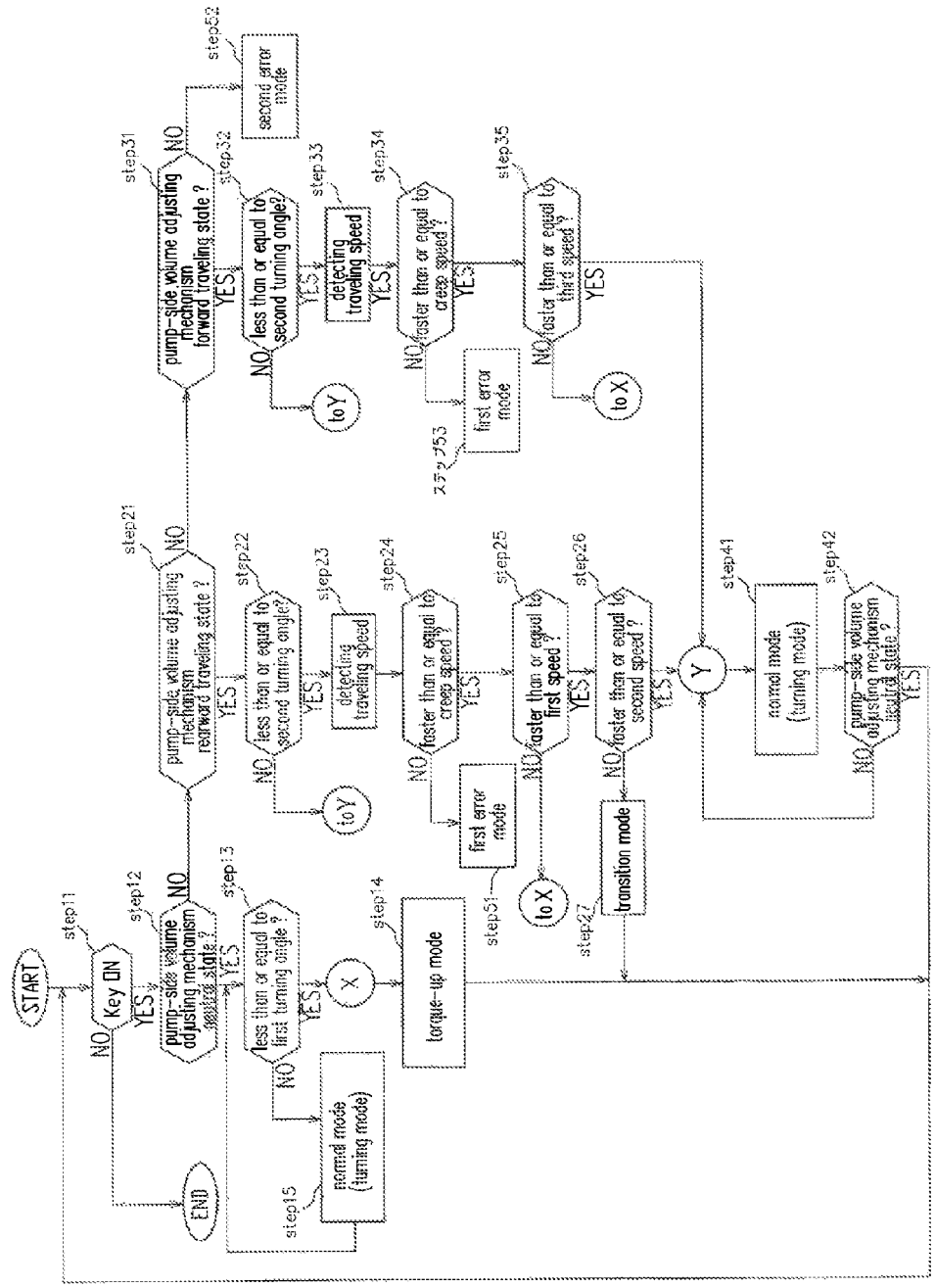
[FIG. 12]

FIG. 12 is a flowchart of the control device 90.

The control device 90 activates the torque-up mode when the vehicle is in the idling state in which the driving power source 40 is in the operation state and the pump-side volume adjusting mechanism 54 is in the neutral state.

More specifically, as shown in FIG. 12, the control device 90 determines at step 11 whether a key has been located at an ON position. The control device 90 deems that the driving power source 40 is in the operation state and proceeds to following step 12 if YES at step 11 while finishes the control if NO at step 11.

At step 12, the control device 90 determines whether the pump-side volume adjusting mechanism 54 is in the neutral state (step 12).

This determination may be made by detecting the position, around the axis line, of the pump-side control shaft of the pump-side volume adjusting mechanism 54 by a hydraulic pump sensor 71 (see FIG. 2), for example.

If YES at step 12, the control device 90 determines whether the turning angle of the work vehicle 1 is less than or equal to a predetermined first turning angle (step 13).

This determination is made based on the signal of the turning-angle sensor.

The first turning angle is set to 15°, for example.

If YES at step 13, the control device 90 proceeds to step 14 to activate the torque-up mode and then returns to step 11.

On the other hand, if NO at step 13, that is, if the work vehicle 1 is in the turning state in which the turning angle larger than the first turning angle, the control device 90 proceeds to step 15 to activate the normal mode. This is for prohibiting the activation of the torque-up mode at the time when the work vehicle 1 is in the turning state in which the turning angle is larger than the predetermined first turning angle.

If NO at step 12, the control device 90 determines whether the pump-side volume adjusting mechanism 54 is in a rearward traveling state (step 21).

This determination is made based on the signal from the hydraulic pump sensor 71.

The control device proceeds to a flow for traveling rearward if YES at step 21, while it proceeds to step 31 if NO at step 21.

More specifically, if YES at step 21, the control device 90 determines whether the turning angle of the work vehicle is less than or equal to a second turning angle that is larger than the first turning angle (step 22).

This determination is made based on the signal from the turning-angle sensor.

The second turning angle is set to 40°, for example.

If NO at step 22, that is, if the work vehicle 1 is in the turning state in which the turning angles exceeds the second turning angle, the control device 90 proceeds to step 41 to activate the normal mode.

If YES at step 22, the control device 90 recognizes the traveling speed based on the signal from the traveling-speed sensor 62 (step 23), and then determines whether the traveling speed is larger than a predetermined creep speed (step 24).

The creep speed is set to a speed lower than a minimum traveling speed with which the work vehicle 1 travels in a case where the pump-side volume adjusting mechanism 54 is operated in the rearward direction to such an extent that the determination at step 21 is YES.

That is, the creep speed is set to the speed lower than the minimum traveling speed with which the work vehicle travels in a case where the determination at step 21 is YES.

Accordingly, if NO at step 24, it is presumed that any errors such as an engine stall or leakage of operation fluid in the HST would happen.

Therefore, if NO at step 24, the control device 90 activates a first error mode (step 51).

For example, the first error mode informs a user of a first error via a announcing means such as a monitor or speaker, and prohibits the control of the electric motor 300 and holds the electric motor 300 at the status at the time.

If YES at step 24, that is, If the first error does not happen, the control device 90 determines whether the traveling speed is higher than or equal to the first speed (step 25).

If NO at step 25, the control device determines that the work vehicle has been shifted from the idling state to a start-moving state but is still in a state that needs a significant traveling torque, and then proceeds to the step 14 to maintain or activate the torque-up mode.

On the other hand, if YES at step 25, the control device 90 determined that the work vehicle has been shifted through the start-moving state to the vehicle traveling state.

The control device determines whether the traveling speed of the work vehicle 1 exceeds the second speed that is higher than the first speed (step 26).

If NO at step 26 (if the traveling speed is higher than or equal to the first speed but lower than the second speed), the control device 90 activates a transition mode (step 27), and returns to step 11.

On the other hand, if YES at step 26 (the traveling speed exceeds the second speed), the control device 90 activates the normal mode (step 41).

The transition mode controls the activation of the electric motor 300 so that the volume of the first hydraulic motor 120 is varied between the first volume and the standard volume in accordance with the traveling speed between the first speed and the second speed.

As explained above, in the present embodiment, if the traveling speed reaches the first speed with the torque-up mode being activated, the control device cancels the torque-up mode to activate the transition mode and then cancels the transition mode to activate the normal mode, rather than it cancels the torque-up mode and immediately or directly activates the normal mode, wherein the transition mode control the electric motor 300 so that the volume of the first hydraulic motor 120 is changed from the first volume to the standard volume as the traveling speed of the vehicle increases from the first speed to the second speed, and wherein a shift from the transition mode to the normal mode is made when the traveling speed reaches the second speed. The present embodiment makes it possible to smoothly shift the torque-up mode to the normal mode.

In the present embodiment, the transition mode varies the volume of the first hydraulic motor 120 in accordance with a change of the traveling speed between the first and second speeds. Alternatively, the control device can control the electric motor 300 in such a manner as that the volume of the first hydraulic motor 120 is gradually varied from the first volume to the standard volume over a predetermined length of time from a point at which the traveling speed reaches the first speed. In the alternative configuration, the torque-up mode is canceled and the transition mode is activated at the time when the traveling speed reaches the first speed, and the transition mode is canceled and the normal mode is activated after the predetermined length of time has passed from the point when the transition mode is activated.

By the way, as explained earlier, the work vehicle 1 according to the present embodiment is embodied by the hydraulic four-wheel-drive work vehicle in which the first and second wheels 10, 20 arranged on one side and the other side in the vehicle longitudinal direction are operatively and respectively driven by the first and second hydraulic motor units 100, 200.

In such a hydraulic four-wheel-drive work vehicle, a hydraulic motor unit, which drives wheels out of the first and second wheels 10, 20 that are arranged on an opposite side (an upstream side) in a traveling direction, functions as a main traveling-torque generator.

More specifically, in a case where the first and second wheels 10, 20 are front and rear wheels, respectively, the fixed displacement second hydraulic motor unit 200 driving the second wheels, which are positioned on an opposite side in the traveling direction when the vehicle travels forward, functions as the main traveling-torque generator, while the variable displacement first hydraulic motor unit 100 driving the first wheels 10, which are positioned on an opposite side in the traveling direction when the vehicle travels rearward, functions as the main traveling-torque generator.

Since the volume (the suction/discharge amount) of the first hydraulic motor 120 is fixed to the first volume in the torque-up mode, the first wheels 10 that are operatively driven by the first hydraulic motor 120 have a peripheral speed slower than that of the second wheels 20 that are operatively driven by the second hydraulic motor 220. As a result, when the torque-up mode is activated, slippages and drags of the first and second wheels 10, 20 may happen.

In consideration of this point, the work vehicle 1 according to the present embodiment is configured so at to effectively activate the torque-up mode at the time when the vehicle starts to travel in a direction that causes the variable displacement first hydraulic motor unit to function as the main traveling-torque generator while preventing the activation of the torque-up mode as much as possible at the time when the vehicle starts to travel in a direction that causes the fixed displacement second hydraulic motor unit 200 to function as the main traveling-torque generator.

More specifically, as explained earlier, the control device 90 determines whether the pump-side volume adjusting mechanism 54 is in the rearward traveling state at step 21 in a case of NO at step 12.

The fact that the pump-side volume adjusting mechanism 54 is in the rearward traveling state means that the first wheels 10 are positioned on an opposite side in the traveling direction, and the variable displacement first hydraulic motor unit 100 driving the first wheels 10 functions as the main traveling-torque generator.

Accordingly, if YES at step 21, the torque-up mode is maintained until the traveling speed reaches the first speed.

If NO step 21, the control device 90 determines whether the pump-side volume adjusting mechanism 54 is in a forward traveling state at step 31.

The fact that the pump-side volume adjusting mechanism 54 is in the forward traveling state means that the second wheels 20 are positioned on an opposite side in the traveling direction, and the fixed displacement second hydraulic motor unit 200 driving the first wheels 20 functions as the main traveling-torque generator.

Accordingly, if YES at step 31, that is, if the pump-side volume adjusting mechanism 54 is in the forward traveling state, the control device 90 determines whether the traveling speed reaches a third speed that is lower than the first speed (step 35), and cancels the torque-up mode at the time when the traveling speed reaches the third speed and then proceeds to step 41 so as to activate the normal mode.

The configuration makes it possible to prevent the variable displacement first hydraulic motor 120 to be unnecessarily fixed to the first volume when the vehicle travels in a direction that causes the fixed displacement type second hydraulic motor unit 200 to function as the main traveling-torque generator, thereby effectively preventing or reducing slippages and/or drags of the first and second wheels 10, 20.

Even in a case where the pump-side volume adjusting mechanism 54 is in the forward traveling state, the control device 90 determines in accordance with the turning angle of the vehicle whether to prohibit the activation of the torque-up mode (step 32).

The control device 90 recognizes the traveling speed based on the signal from the traveling-speed sensor 62 (step 33), and determines whether the traveling speed is higher than or equal to the predetermined creep speed (step 34). If NO at step 34, the control device 90 activates the first error mode (step 53).

If NO at step 31, the control device 90 activates a second error mode (step 52).

More specifically, if the control device determines that the pump-side volume adjusting mechanism 54 is not in the neutral state at step 12, the control device proceeds to step 21. If the control device determines that the pump-side volume adjusting mechanism 54 is not in the rearward traveling state at step 21, the control device proceeds to step 31. Accordingly, in a theoretical sense, there is no possibility that the determination at step 31 is NO.

From such a reason, if the determination at step 31 is NO, there is a possibility that some kind of error happens in the hydraulic pump sensor 71 that detects an actuating condition of the pump-side volume adjusting mechanism 54.

Therefore, the second error mode informs the user of an occurrence of the second error by an informing means such as a monitor or speaker, a allows only the activation of the normal mode while prohibiting the activation of the torque-up mode.

As explained earlier, the work vehicle 1 according to the present embodiment activates the torque-up mode that fixes the volume of the suction/discharge amount of the first hydraulic motor 120 to the first volume larger than the standard volume when the vehicle is in the idling state before starting to travel, and cancels the torque-up mode and activates the normal mode immediately or through the transition mode when the traveling speed of the vehicle reaches the first speed, while including the normal mode that allows both the first and second wheels 10, 20 to be driven and prevents slippages and drags of the first and second wheels 10, 20 by varying the volume or the suction/discharge amount of the first hydraulic motor 120 in accordance with the tuning angle of the vehicle.

The configuration makes it possible to drive both the first and second wheels 10, 20 without slippages and drags of the first and second wheels 10, 20 in either case in traveling straight and making a turn by activating the normal mode when the vehicle is traveling, and obtain a significant traveling torque without an operation by the operator by automatically activating the torque-up mode when the vehicle starts to travel, which requires a significant traveling torque, thereby effectively preventing lack of traveling torque at the time when the vehicle starts to travel.

In the present embodiment, the normal mode is configured so as to control the electric motor so that the driving speed of the first wheels is varied in accordance with the difference in turning radius between the first and second wheels. However, the present invention is not limited to the configuration.

More specifically, the present invention could be applied to a hydraulic four-wheel-drive work vehicle that includes first and second wheels arranged on one side and the other side in a vehicle longitudinal direction, variable displacement first and second hydraulic motor units driving the first and second wheels, respectively, and a variable displacement hydraulic pump unit with which the first and second hydraulic motor units are fluidly connected in series, wherein a pump-side volume adjusting mechanism of the hydraulic pump unit functions as a main speed-change device, and wherein first and second motor-side volume adjusting mechanisms of the first and second hydraulic motor units function as a sub speed-change device.

In the thus configured work vehicle, the first and second motor-side volume adjusting mechanisms are operated by an electric motor in a synchronized manner to each other in accordance with a manual operation. That is, the first and second motor-side volume adjusting mechanisms are operated in a synchronized manner to each other by one or paired electric motors in accordance with a manual operation on a sub speed-change operating member.

In this case, the normal mode is embodied by a control mode that controls the one or paired electric motors in accordance with the manual operation on the sub speed-change operating member, while the torque-up mode is embodied by a control mode that controls the one or paired electric motors so as to forcibly cause the first and second hydraulic motor units to have large volumes regardless of a condition of the manual operation of the sub speed-change operating member.

Description of the Reference Numerals

1 hydraulic four-wheel-drive work vehicle
10 first wheel
20 second wheel
30 vehicle frame
31 first frame
32 second frame
35 pivot shaft
40 driving power source
50 hydraulic pump unit
52 hydraulic pump
54 pump-side volume adjusting mechanism
62 traveling-speed sensor
90 control device
100 first hydraulic motor unit (variable displacement hydraulic motor unit)
120 first hydraulic motor (variable displacement hydraulic motor)
135 motor-side volume adjusting mechanism
200 second hydraulic motor unit
300 electric motor

The invention claimed is:

1. A hydraulic four-wheel-drive work vehicle comprising:
   a vehicle frame;
   first and second wheels supported by the vehicle frame on one side and the other side in a vehicle longitudinal direction, respectively;
   a driving power source supported by the vehicle frame;
   a variable displacement hydraulic pump unit that is operatively driven by the driving power source; and
   first and second hydraulic motor units that are fluidly connected to the hydraulic pump unit and operatively drive the first and second wheels, respectively,
   wherein at least one of the first and second hydraulic motor units is of a variable displacement type,
   wherein the hydraulic pump unit includes a hydraulic pump operatively driven by the driving power source and a pump-side volume adjusting mechanism varying a volume of the hydraulic: pump in accordance with a rotation of a pump-side control shaft around an axis line,
   wherein the variable displacement hydraulic motor unit includes a variable displacement hydraulic motor and a motor-side volume adjusting mechanism varying a volume of the variable displacement hydraulic motor between a standard volume and a first volume that is larger than the standard volume in accordance with a rotation of a motor-side control shaft around an axis line, wherein the hydraulic four-wheel-drive work vehicle further comprises an electric motor that is operatively connected to the motor-side control shaft so as to rotate it around the axis line and a control device configured to control that controls an actuation of the electric motor, wherein the control device is configured to switch the actuation of the electric motor between a normal mode and a torque-up mode, the normal mode controlling the actuation of the electric motor to vary the volume of the variable displacement hydraulic motor in accordance with a manual operation or an automatic operation based on a difference in turning radius between the first and second wheels, the torque-up mode fixing the volume of the variable displacement hydraulic motor to the first volume, and wherein the control device is configured to activate the torque-up mode if it determines that the vehicle is in an idling state in which the driving power source is in an operating state and the pump-side volume adjusting mechanism is in a neutral state, and cancel the torque-up mode and activate the normal mode if it determines based on a signal from a traveling-speed sensor that a traveling speed of the vehicle reaches a first speed while prohibiting the torque-up mode from being activated and activating the normal mode if a turning radius of the vehicle exceeds a predetermined first turning angle.

2. A hydraulic, four-wheel-drive work vehicle according to claim 1, wherein the first and second wheels are arranged so that a turning radius of the first wheels becomes smaller than that of the second wheels as the turning radius of the vehicle becomes larger, wherein the first hydraulic motor unit that drives the first wheels is of a variable displacement type, wherein the standard volume is set in such a manner as to cause a peripheral speed of the first wheels that is driven by the first hydraulic motor to be substantially same as that of the second wheels that is driven by the second hydraulic motor, wherein the first volume is set in such a manner as to cause the peripheral speed of the first wheels to be reduced by an amount corresponding to the difference in turning radius between the first and second wheels when the vehicle makes a maximum turn and wherein the normal mode controls the electric motor based on a signal from a turning angle sensor so that the volume of the first hydraulic motor is set to the standard volume when the vehicle is in a straight-traveling state while the volume of the first hydraulic motor is varied from the standard volume to the first volume as the vehicle is shifted from the straight-traveling state to a maximum-turning state.

3. A hydraulic four-wheel-drive work vehicle according to claim 2, wherein the vehicle frame includes first and second frames that are connected to each other in a swinging manner around a pivot shaft along a substantially vertical direction, wherein the second wheels are supported by the second frame, and wherein the first wheels are supported by the first frame in such a manner as that a length in the vehicle longitudinal direction between the first wheels and the pivot shaft becomes longer than a length in the vehicle longitudinal direction between the second wheels and the pivot shaft.

4. A hydraulic four-wheel-drive work vehicle according to claim 2, wherein the control device is configured to cancel the torque-up mode and activate a transition mode rather than the normal mode at the time when the traveling speed reaches the first speed in a state where the torque-up mode is activated, the transition mode controlling the electric motor so that the volume of the first hydraulic motor is varied from the first volume to the standard volume as the traveling speed is increased from the first speed to a second speed that is higher than the first speed, and the control device is configured to then cancel the transition mode and activate the normal mode at the time when the traveling speed reaches the second speed.

5. A hydraulic four-wheel-drive work vehicle according to claim 2, wherein the control device is configured to cancel the torque-up mode and activate a transition mode rather than the normal mode at the time when the traveling speed reaches the first speed in a state where the torque-up mode is activated, the transition mode controlling the electric motor so that the volume of the first hydraulic motor is gradually varied from the first volume to the standard volume over a predetermined period of time, and the control device is configured to cancel the transition mode and activate the normal mode after the predetermined period of time has passed.

6. A hydraulic four-wheel-drive work vehicle according to claim 2, wherein the second hydraulic motor unit that drives the second wheels is of a fixed displacement type, and wherein the control device is configured to cancel the torque-up mode and activate the normal mode at the time when the traveling speed reaches a third speed that is lower than the first speed if the control device determines that the vehicle has been shifted from an idling state to a traveling state in one direction in the vehicle longitudinal direction that causes the first wheels to be positioned on a front side in the traveling direction.

7. A hydraulic four-wheel-drive work vehicle according to claim 3, wherein the control device is con figured to cancel the torque-up mode and activate a transition mode rather than the normal mode at the time when the traveling speed reaches the first speed in a state where the torque-up mode is activated, the transition mode controlling the electric motor so that the volume of the first hydraulic motor is varied from the first volume to the standard volume as the traveling speed is increased from the first speed to a second speed that is higher than the first speed, and the control device is configured to then cancel the transition mode and activate the normal mode at the e time when the traveling speed reaches the second speed.

8. A hydraulic four-wheel-drive work vehicle according to claim 3, wherein the control device is configured to cancel the torque-up mode and activate a transition mode rather than the normal mode at the time when the traveling speed reaches the first speed in a state where the torque-up mode is activated, the transition mode controlling the electric motor so that the volume of the first hydraulic motor is gradually varied from the first volume to the standard volume over a predetermined period of time, and the control device is configured to cancel the transition mode and activate the normal mode after the predetermined period of time has passed.

9. A hydraulic four-wheel-drive work vehicle according to claim 3,
wherein the second hydraulic motor unit that drives the second wheels is of a fixed displacement type, and
wherein the control device is configured to cancel the torque-up mode and activate the normal mode at the time when the traveling speed reaches a third speed that is lower than the first speed if the control device determines that the vehicle has been shifted from an idling state to a traveling state in one direction in the vehicle longitudinal direction that causes the first wheels to be positioned on a front side in the traveling direction.

10. A hydraulic four-wheel-drive work vehicle according to claim 4,
wherein the second hydraulic motor unit that drives the second wheels is of a fixed displacement type, and
wherein the control device is configured to cancel the torque-up mode and activate the normal mode at the time when the traveling speed reaches a third speed that is lower than the first speed if the control device determines that the vehicle has been shifted from an idling state to a traveling state in one direction in the vehicle longitudinal direction that causes the first wheels to be positioned on a front side in the traveling direction.

11. A hydraulic four-wheel-drive work vehicle according to claim 5,
wherein the second hydraulic motor unit that drives the second wheels is of a fixed displacement type, and
wherein the control device is configured to cancel the torque-up mode and activate the normal mode at the time when the traveling speed reaches a third speed that is lower than the first speed if the control device determines that the vehicle has been shifted from an idling state to a traveling state in one direction in the vehicle longitudinal direction that causes the first wheels to be positioned on a front side in the traveling direction.

12. A hydraulic four-wheel-drive work vehicle according to claim 7,
wherein the second hydraulic motor unit that drives the second wheels is of a fixed displacement type, and
wherein the control device is configured to cancel the torque-up mode and activate the normal mode at the time when the traveling speed reaches a third speed that is lower than the first speed if the control device determines that the vehicle has been shifted from an idling state to a traveling state in one direction in the vehicle longitudinal direction that causes the first wheels to be positioned on a front side in the traveling direction.

13. A hydraulic four-wheel-drive work vehicle according to claim 8,
wherein the second hydraulic motor unit that drives the second wheels is of a fixed displacement type, and
wherein the control device is configured to cancel the torque-up mode and activate the normal mode at the time when the traveling speed reaches a third speed that is lower than the first speed if the control device determines that the vehicle has been shifted from an idling state to a traveling state in one direction in the vehicle longitudinal direction that causes the first wheels to be positioned on a front side in the traveling direction.

* * * * *